United States Patent
Kanevsky et al.

(10) Patent No.: US 10,158,616 B1
(45) Date of Patent: Dec. 18, 2018

(54) METHODS AND SYSTEMS FOR ONLINE ACCESS CREDENTIAL TRANSITION

(71) Applicant: Google LLC, Mountain View, CA (US)

(72) Inventors: Dimitri Kanevsky, Mountain View, CA (US); Marcel Yung, New York, NY (US)

(73) Assignee: Google LLC, Mountain View, CA (US)

( * ) Notice: Subject to any disclaimer, the term of this patent is extended or adjusted under 35 U.S.C. 154(b) by 210 days.

(21) Appl. No.: 15/214,754

(22) Filed: Jul. 20, 2016

(51) Int. Cl.
*G06F 21/00* (2013.01)
*H04L 29/06* (2006.01)

(52) U.S. Cl.
CPC ............ *H04L 63/06* (2013.01); *H04L 63/083* (2013.01); *H04L 63/10* (2013.01)

(58) Field of Classification Search
CPC .............................. H04L 63/083; H04L 63/10
USPC ................................................ 726/5–6, 18–19
See application file for complete search history.

(56) References Cited

U.S. PATENT DOCUMENTS

| | | | |
|---|---|---|---|
| 6,741,729 B2 | 5/2004 | Bjorn et al. | |
| 7,139,917 B2 | 11/2006 | Jablon | |
| 7,237,028 B2 | 6/2007 | Pfeffer et al. | |
| 7,552,467 B2 | 6/2009 | Lindsay | |
| 7,681,234 B2 * | 3/2010 | Florencio | H04L 63/14 726/22 |
| 7,735,124 B2 | 6/2010 | Lin et al. | |
| 7,743,256 B2 | 6/2010 | Yang | |
| 8,281,147 B2 | 10/2012 | Florencio et al. | |
| 8,539,550 B1 * | 9/2013 | Terres | G06F 21/31 726/16 |
| 8,745,712 B2 | 6/2014 | Chao et al. | |
| 8,826,029 B2 | 9/2014 | Cheng et al. | |
| 8,856,896 B1 | 10/2014 | Johansson et al. | |
| 8,910,253 B2 | 12/2014 | Johnson et al. | |
| 2013/0097697 A1 | 4/2013 | Zhu et al. | |
| 2013/0326467 A1 * | 12/2013 | Nair | G06F 11/3664 717/101 |
| 2014/0017653 A1 | 1/2014 | Romney et al. | |

(Continued)

FOREIGN PATENT DOCUMENTS

| | | |
|---|---|---|
| EP | 1708110 A1 | 10/2006 |
| EP | 2136309 A2 | 12/2009 |

OTHER PUBLICATIONS

Gibson, M., Opening the Web for All: Inclusive and Secure Design of an Online Authentication System, University of Bedfordshire, Sep. 11, 2012, 235 pgs, URL: http://uobrep.openrepository.com/uobrep/handle/10547/576437.

(Continued)

*Primary Examiner* — Jahangir Kabir
(74) *Attorney, Agent, or Firm* — Honigman Miller Schwartz and Cohn LLP

(57) ABSTRACT

Systems and methods for online access credential transition are described, including receiving a first string of elements associated with a subsequent online access credential, during a credential transition period, receiving a second string of elements associated with an attempted subsequent online access credential, performing a matching operation to determine a degree of matching between the first string of elements and the second string of elements, and based on the degree of matching between the first string of elements and the second string of elements, providing online feedback, and prompting another attempted subsequent online access credential.

16 Claims, 24 Drawing Sheets

(56) References Cited

U.S. PATENT DOCUMENTS

2014/0150084 A1 5/2014 Lee et al.
2016/0380989 A1* 12/2016 Bailey .................... H04L 63/08
726/5

OTHER PUBLICATIONS

Halevi, S., et al., Public-Key Cryptography and Password Protocols, ACM Transactions on Information and System Security (TISSEC), 2(3), Feb. 2, 1999, 29 pgs.
Jablon, D. P., Extended Password Key Exchange Protocols Immune to Dictionary Attack, Enabling Technologies: Infrastructure for Collaborative Enterprises, Jun. 18-20, 1997, Cambridge, MA, 8 pgs.
O'Gorman, L., Comparing Passwords, Tokens, and Biometrics for User Authentication, Proceedings of the IEEE, 91 (12), Dec. 2003, pp. 2019-2040.

* cited by examiner

261

Enter Old Password

263

1 2 3 4 5 6 7 8

Suggest New Password

Enter Old Password
273
1 2 3 4 5 6 7 8

Enter New Password
275
10 11 10 12 13 14

Wrong New Password
277
9 11 10 12 13 14
*User Repeats*

283 → Enter Old Password
1 2 3 4 5 6 7 8

285 → Enter New Password
10 11 10 12 13 14

287 → 287a → Wrong New Password
10 11 10 12 13 14
*Correct signs and fill gaps*

289 → Correct New Password
9 11 10 12 13 14

Enter Old Password

291
1 2 3 4 5 6 7 8

Enter New Password

292
9 11 11 13 13 14

293a  293b
Wrong New Password

293
9 11 11 13 13 14

*Correct signs and fill gaps*

Correct New Password

294
9 11 10 12 13 14

*User Corrects*

METHODS AND SYSTEMS FOR ONLINE ACCESS CREDENTIAL TRANSITION

BACKGROUND

Field

The subject matter discussed herein relates generally to methods and systems of online access credential transition, and more particularly, to a protocol between a host and a client to perform online access credential transition in a privacy-preserving manner.

Related Art

A user of an online account is typically required to change the credential on a regular basis (e.g., every three months). The user may have multiple online accounts for different online applications, such as online banking, social network, or bill payment. Further, the user may have one or more hardware implementations, such as mobile phones, laptops, tablets. As a result, the user must remember new credentials that are introduced regularly for different online accounts, and at different hardware implementations.

Related art approaches may include commonly storing credentials (e.g., on paper or a local file in a user device). However, this related art approach is dangerous, because the list of credentials may be observed by others or become lost, and fall into the possession of a bad actor (e.g., intruder or hacker).

In another related art approach, the user may not write or store the credential, but may instead memorize the credential completely. Thus, the user may be queried and provided with a method to introduce and remember a new credential. However, the user may wish to create a secure credential (e.g., a password that is not associated with regular data such as family names, cell phones, birthdays, or the like). According to this related art approach, it is difficult for the user to create and memorize new credentials.

A user may have a multimedia credential (e.g., hand gestures, voice, etc.). In the related art, extensive support is provided for multimedia credential recovery. However, this approach is costly.

Other related art approaches may include biometric information (e.g., voice prints or finger prints) to provide additional verification of user identity. In this approach, the frequency of credential change may be reduced, and the same credential may be used to access various online accounts from different devices. Similarly, indirect identification may provide authentication based on answers to random questions for which only a legitimate user should know the answer, or using the user email registered in the system. However, this approach is time consuming, weak from a security viewpoint, and may not be appropriate in certain environments such as public places.

Thus, there is a need to provide a secure process for a user to memorize a new credential without exposing it to others (e.g., intruders or strangers), and to have credentials that are useful and memorable, so as to reduce reliance on insecure methods and extensive support.

SUMMARY

The subject matter includes computer-implemented methods for online access credential transition.

Accord to an aspect of an example implementations, a method for online access credential transition is provided that includes receiving a first string of elements associated with a subsequent online access credential, during a credential transition period, receiving a second string of elements associated with an attempted subsequent online access credential, performing a matching operation to determine a degree of matching between the first string of elements and the second string of elements, and based on the degree of matching between the first string of elements and the second string of elements, providing online feedback, and prompting another attempted subsequent online access credential.

Accord to an aspect of an example implementations, systems and methods for online access credential transition are provided, including means for receiving a first string of elements associated with a subsequent online access credential; means for, during a credential transition period, receiving a second string of elements associated with an attempted subsequent online access credential, means for performing a matching operation to determine a degree of matching between the first string of elements and the second string of elements, and means for, based on the degree of matching between the first string of elements and the second string of elements, providing online feedback, and prompting another attempted subsequent online access credential.

The methods are implemented using one or more computing devices and/or systems. The methods may be stored in computer-readable media.

BRIEF DESCRIPTION OF THE DRAWINGS

FIGS. 2A-2K shows an example for the protocol according to the example implementation.

FIGS. 7A-7B shows another example implementation, directed to gesture-based credentials.

DETAILED DESCRIPTION

Figure 1:
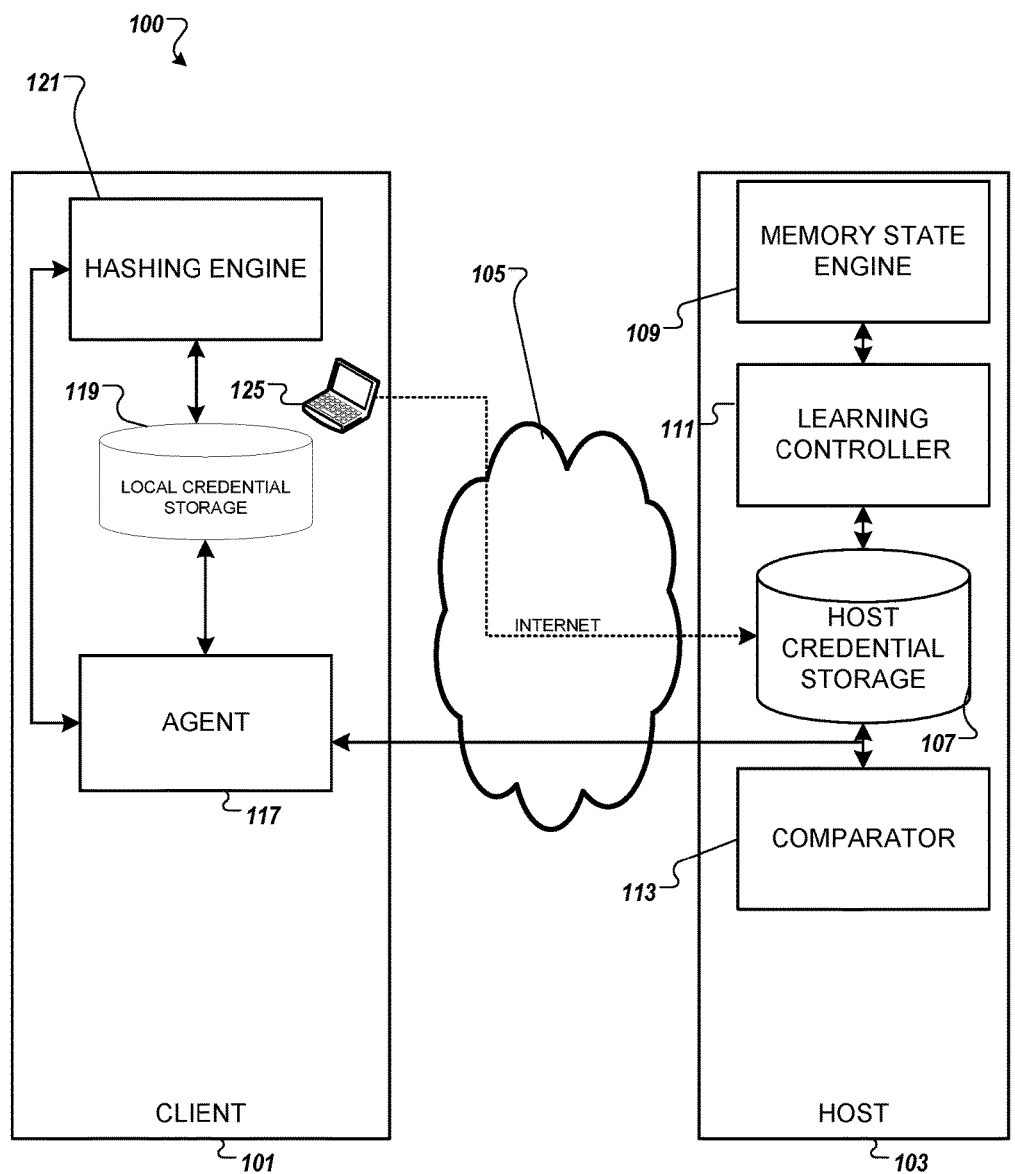
FIG. 1 shows a system having a client and a host having a protocol according to an example implementation.

The subject matter described herein is taught by way of example implementations. Various details have been omitted for the sake of clarity and to avoid obscuring the subject matter. The examples shown below are directed to structures and functions for implementing systems and methods for online access credential transition in a manner that protects user security and privacy.

In the field of credential management, the need for users to rely on user self-transition rather than technical support is increasing. For example, instead of credential recovery and management (e.g., technical support), a more self-reliant example approach may include a transitional period for learning the credential that provides for usability and smooth motion from one credential to another, such as in a multimedia credential system. Further, a user may learn to memorize a new credential without compromising a security system. Accordingly, a credential may be considered as information to be learned, and the system may assess the user level of memory and adapt accordingly. In the related art, a new credential may be considered an 'objects', as compared with an indication of a state of mind in the example implementations.

Example implementations include a method of online user credential (e.g., password) transition. According to the method, when the online application starts a credential transition period (e.g., one week before credential expiration), the user is prompted to provide a new (e.g., subsequent) credential, as well as continuing to use the current credential for authentication. During this transition period, the user is provided with two interfaces (e.g., windows) for credential entry. In the first window, the user enters the current credential, and the second window, the user enters the subsequent credential. If the user incorrectly attempts or forgets the new credential, the user is provided with a reminder.

During that period, the new credential may be maintained as clear text, without any hashing or encryption, so that a comparison can be performed between the attempt and the selected new credential on a granular (e.g., character-by-character) basis. Alternatively, each element of the new credential may be individually hashed at the client and provided to be stored in the host (e.g., server).

After verification that the user has learned the new credential, the current credential is set to the new credential. At this point, the credential is hashed and no longer available in clear text. More specifically, the credential is hashed with a cryptographically strong hash to avoid leakage.

Accordingly, when the new credential is chosen, the current credential continues to be valid. The new credential is thus considered to be in a training mode. During the training mode, the user may learn the new credential after entering the current credential for authentication, based on feedback. More specifically, the online application (e.g., host) defines the 'state of memory' of the user, and assesses over time the ability level of the user to memorize the new credential. Optionally, the time window for training can be bounded. Once the host has verified that the user has fully learned the new credential, the new credential replaces the current credential. Thus, the learning level of the user is assessed over the time.

Thus, the credential in the clear is available to the host during the learning time. Alternatively, the credential may be stored based on a one-way function (hashing) of the credential, H(credential). According to this implementation, when the credential appears to be exposable at the host, it may actually be protected.

After it has been determined that the new credential has been learned by the user, the new credential is changed to being protected by a one-way function mode, as explained in greater detail below.

According to another aspect, the host can provide the user with a training hint with respect to parts of the new credential attempt that were not entered correctly. For example, the user can be provided with an indication that certain positions in the credential are not correct (e.g., third and ninth element of the password is not correct). This approach may be used where the credential involves plural queries, or the credential is especially long.

Example implementations are not limited to text credentials such as passwords, and other credentials may be substituted therefor as would be understood by those skilled in the art. For example, but not by way of limitation, more complex gesture credentials may be used, such as when a user is trained to make accurate motions that constitute the credential. Such an alternate example implementation is explained below with respect to FIGS. 7A and 7B. Further, biometric credentials may also be used, in combination with the text and/or gestures.

The example implementation may permit the credential transition period to be shortened by reducing the amount of time required for the user to successfully transition to the new credential. Additionally, the example implementation may provide for the user to be able to maintain the complexity requirements associated with high-security credentials. Thus, privacy and security may be preserved.

FIG. 1 shows a system 100 having a client 101 and a host 103 having a protocol according to an example implementation. More specifically, the client 101 and the host 103 are communicatively coupled to one another via a network such as the Internet 105.

Host 103 includes host credential storage 107, a memory state engine 109, a learning controller 111, and a comparator 113. Client 101 includes an agent 117, a local credential storage 119 and a hashing engine 121. One or more additional devices 125, such as a laptop computer, tablet, mobile computing device or other client based computing device, may be provided at the client 101. According to the protocol, some operations may be performed by the agent 117 at the client 101, and other operations may be performed at the host 103.

In the system 100, outgoing data that is sent from a device 125 of the client 101, via the Internet 105, is received by the host 103. For example, but not by way of limitation, this outgoing data may include the current credential, the proposed new credential, or an attempted new credential.

According to an example implementation, a user may attempt to enter his or her credentials at device 125. When such an attempt is made during the credential transition window, the user may enter the current credential, and may suggest a new credential. On subsequent attempts during this transition period, the user may attempt to reenter the new credential.

The hashing operation is performed at the hashing engine 121 of the client 101. Accordingly, a one-way hash (e.g., cryptographically strong hash) is performed on the input provided by the user for the current credential. An agent 117 at the client 101 provides the hashed current credential, via a network such as the Internet 105, to the host 103.

Optionally, the local credential storage 119 may be used to store information associated with the current credential attempt. Such information may be provided from the local credential storage 119 to the agent 117, and the information may then be provided by the agent 117 to the host 103. Such information may include, but is not limited to, successful or unsuccessful hashed attempts to enter the current credential, a number of successful attempts, or other information associated with current credential authentication, as would be understood by those skilled in the art.

The proposed new credential at the start of the transition window, and the new credential attempt during the transition window, are provided by the user at the device 125 to the host 103. This information may be provided directly via a network such as the Internet 105. Alternatively, this information may be provided via the agent 117, along with the hashed information associated with the current credential attempt. Both the proposed new credential and the new credential attempt may be provided to the host 103 as clear text.

Alternatively, each element of the proposed new credential may be individually hashed at the client 101 by the hashing engine 121 and provided via the agent 117 to be stored in the host 103 at the host credential storage 107. In this alternate example implementation, the attempted new credential also has each element individually hashed by the hashing engine 121 and provided via the agent 117 to the host 103, where the comparator 113 compares the hashes of each of the individual elements of the attempted new credential and the proposed new credential.

For the proposed new credential being provided to the host 103, this information is stored in the host credential storage 107. Accordingly, each time the new credential attempt provided to the host 103, comparator 113 compares the proposed new credential to the new credential attempt, to determine whether there is a match. The comparator 113 provides a result as to whether there is a match, as well as further detailed information on any nonmatching parts of the proposed new credential and the new credential attempt.

Additionally, the host 103 includes a memory state engine 109 and a learning controller 111. The memory state engine 109 receives information from the comparator 113 and the host credential storage 107 that indicates a memory state based on various factors. Those factors include, but are not limited to, the amount of time that has passed since the start of the credential transition period, a number of unsuccessful new credential attempts, quality of the unsuccessful new credential attempts in terms of the degree of nonmatching elements, or a characteristic associated with a profile of the user that is indicative of ability to memorize proposed new credential. Based on these factors, the memory state engine 109 may assess a memory state during the credential transition period.

The memory state engine 109 may also consider a learning state of mind associated with the user of the account. For example, but not by way of limitation, a different learning window may be established, using different tools, for example for children, with the permission of the user or an authorized account holder acting on behalf of the user. Similarly, a user may optionally indicate in the user profile associated with the account a preference for certain learning or training hints. For example, a user having a medical condition that has caused memory loss, or having a condition with difficulty in learning or memorizing information, may request appropriate learning or training hints. With the permission of the user, the example implementation will provide training hints to the user on this basis, based on information generated by the learning controller.

Based on the memory state as determined by the memory state engine 109, learning controller 111 generates feedback to assist the user in memorizing the proposed new credential. For example, but not by way of limitation, the learning controller 111 may provide, either directly or via agent 117 at the client 101, a hint to the user at device 125. The hint may assist the user in not only successfully attempting the proposed new credential, but also in memorizing or learning the proposed new credential. As the user improves his or her memory state, the hint may become more challenging or difficult, so that the user may memorize proposed new credential more quickly, and the training period may close more quickly. Factors similar to those applied to the memory state engine 109, may also be used to determine the feedback provided by the learning controller 111 the user at client 101.

Further, the length of the training period may be shortened as the memory state changes.

Figure 2A:
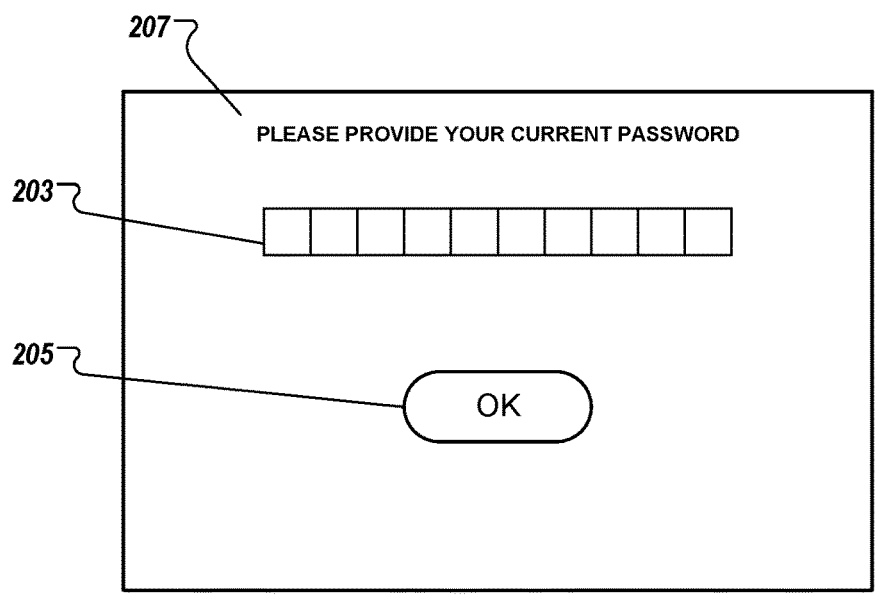

FIGS. 2A-2J shows an example for the protocol according to the example implementation. FIG. 2A illustrates a user interface 201 that may be provided for the user to attempt the current credential, regardless of whether the system is in the credential training period or not. At 203, the user may input a credential, such as a password or string of characters, and then activate object 205, to authenticate and access the online application. A prompt or description 207 is provided, indicate user that they are attempting the current credential.

Figure 2B:
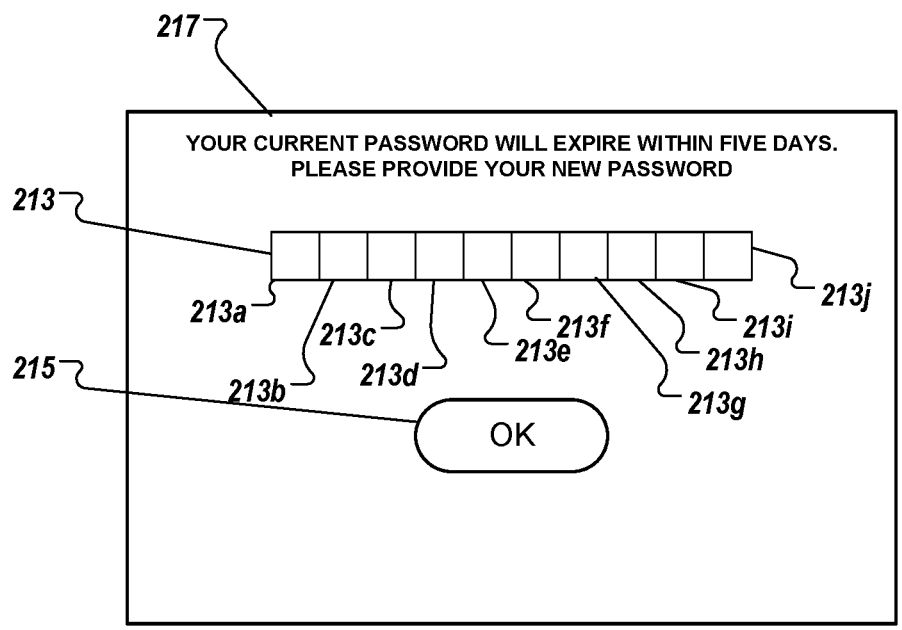

As shown in FIG. 2B, at the start of the training period, the user may be provided with an interface 211 that permits the user to attempt a proposed new credential. More specifically, the user may enter the proposed new credential at 213 as a string of password characters 213*a* . . . 213*j*. After entering the proposed new credential at 213, the user may select the object 215, to provide the proposed new credential to the host. As explained above, the proposed new credential may be provided to the host as clear text. Alternatively, a hash of each individual element of the proposed new credential may be provided. Further, a prompt or description 217 is also provided, which indicates to the user that the information to be entered will be the proposed new credential. Optionally, the product or description 217 may also indicate that the transition period is in progress, and may optionally indicate a length of the transition period, such as five days, for example. FIGS. 2A and 2B may either be shown in sequence, as explained above, or simultaneously.

Figure 2C:
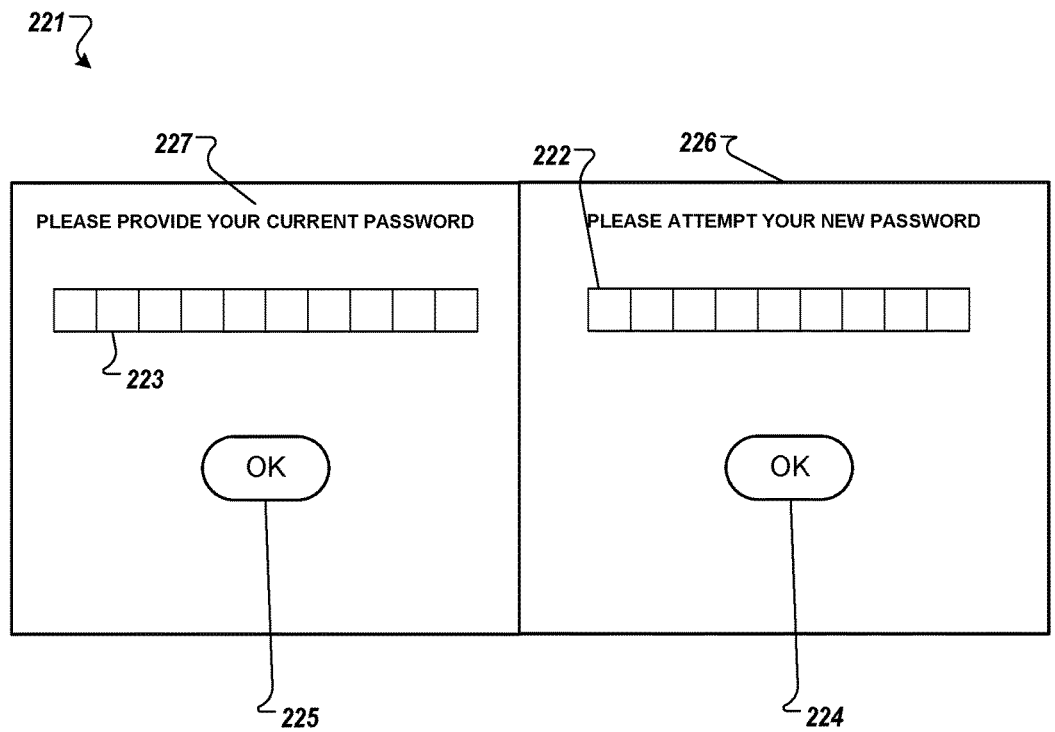

As shown in FIG. 2C, once the transition period has started and the proposed new credential has been provided to the host, at the next attempt by the user to access the online application, the user is provided with an interface 221 that permits entry of the current credential as well as the new credential attempt. More specifically, at 223, the user may enter the current credential and select the object 225 to request authentication, as indicated by the prompt 227. At the same interface 221, the user may enter a new credential attempt at 222, and select the object 224 in order to transmit the new credential attempt to the host, as indicated by the prompt 226.

As explained above, the host compares a stored clear text version of the proposed new credential that was previously provided in FIG. 2B, to the clear text version of the new credential attempt provided in FIG. 2C. Alternatively, each element of the proposed new credential may be individually hashed and provided to the host, such that when the attempted new credential has each element individually hashed, a comparison is performed between the hashes of each of the individual elements of the attempted new credential and the proposed new credential.

Figure 2D:

If the host determines that there is a successful match between the proposed new credential and the new credential attempt, at FIG. 2D, an indication of success 233 may be provided at interface 231. The user may close this indication by selecting object 235. At this point, depending on the memory state, the host may determine the training period and set the current credential to the proposed new credential. Alternatively, the memory state may indicate that more than a single successful attempt at the new credential is necessary to complete the training period. In such a circumstance, the memory state may also be updated based on the successful attempt, and the training period may be adjusted to be shortened.

In the event that the new credential attempt does not match the proposed new credential, the user may be provided with a subsequent opportunity to attempt the proposed new credential. The subsequent opportunity may include feedback provided by the host. The feedback may be provided in the form of a training hint that is generated based on memory state of the training period. Further, the feedback may be dynamically adjusted based on the memory state, and the memory state may be updated at each attempt at the new credential.

Figure 2E:
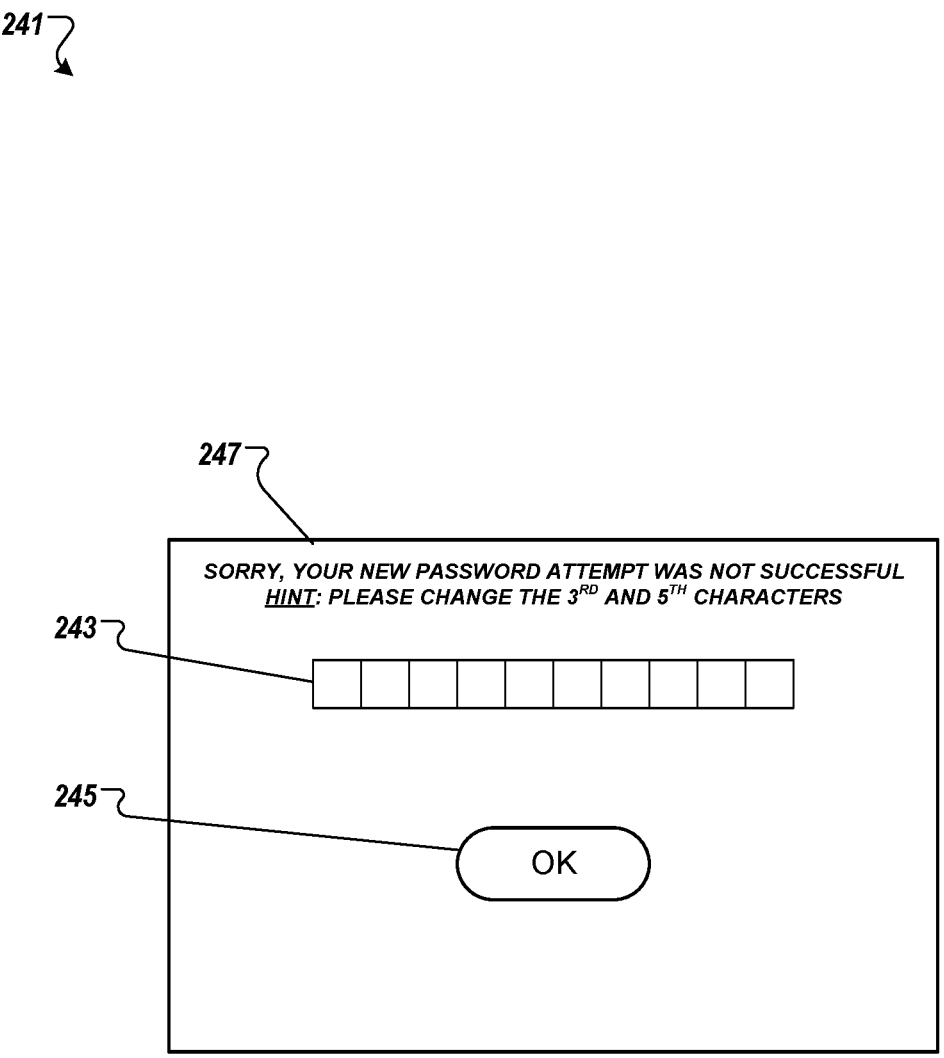

As shown in FIG. 2E, an interface 241 is provided such that the user may make a subsequent attempt at 243 with respect to the proposed new credential, an object 245 may be selected to close the interface. At 247, the feedback as determined by the learning controller is provided. In this case, prior new credential attempt did not match the proposed new credential at the third character and the fifth element. Therefore, the feedback may be a training hint that the user should change the third element and the fifth element. However, the training hint is not limited thereto, and may be adjusted based on the memory state.

For example, but not by way of limitation, the training hint may provide further detail to assist the user in correctly attempting the third and fifth characters, such as a range of characters or a type of character. As the memory state changes to indicate that the user is learning the credential at an increased rate, the difficulty of the hints may be increased, to provide less information with respect to the correct attempt.

Figure 2F:
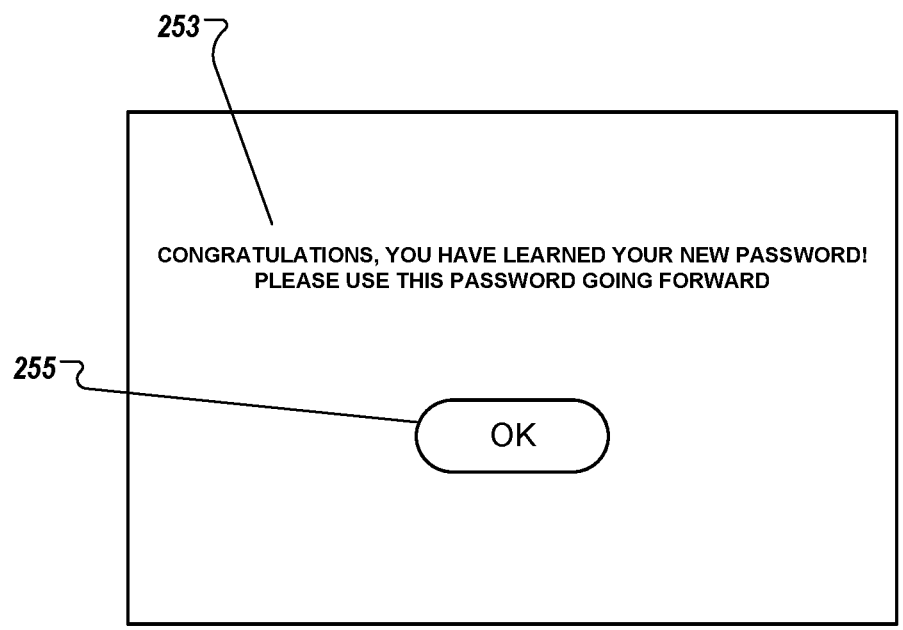

As shown in FIG. 2F, the new credential attempt matches the proposed new credential, and any other conditions for termination of the training period have been met, such as number of successful attempts or expiration of a prescribed time period, an indication is provided at 251 that includes a message 253 informing the user that the training period has been successfully completed, and that the proposed new credential has been set as the current credential. The user selects object 255 in order to close the indication at 251.

FIGS. 2G-2K illustrate a sequence of interfaces that may be provided to the user according to an example implementation. As shown in FIG. 2G, an interface 261 is provided to the user. On this interface 261, the user is prompted at 263 to enter the old or current credential, which is provided as "12345678" by the user. Additionally, and at the same interface 261, the user is also prompted at 265 to suggest a proposed new credential, which is provided as "9 11 10 12 13 14". As explained above, the old credential is subjected to a hashing operation at the client and provided to the host for authentication, while proposed new credential is provided to the host as clear text. Alternatively, as explained above each element of the proposed new credential may be individually hashed and provided to the host.

FIG. 2H illustrates an interface that is provided to a user, at a point after the user has been provided with interface 261, as discussed above and illustrated in FIG. 2G. More specifically, at 271, an interface is provided that prompts user to enter the old credential at 273, which is correctly entered as "12345678". As explained above, the subjected to a one-way hash (e.g., cryptographically strong hash) and provided to the host for authentication. Additionally, at 275, the user is prompted to attempt the new credential. Here, the user enters "10 11 10 12 13 14". This information may be provided as clear text to the host, which compares this attempt to the proposed new credential that was entered at 265. Alternatively, each element of the attempted new credential may be individually hashed and provided to the host, such that a comparison is performed between the hashes of each of the individual elements of the attempted new credential, and respective hashes of each of the individual elements of the proposed new credential.

Because there is not a match, the attempted new credential is indicated in the interface as incorrect at 277. Further, at 277, the user is also provided with the correct proposed new credential, and given an indication that the user must repeat the attempt.

FIG. 2I illustrates an interface that is provided to a user at a point after the user has been provided with interface 271, as discussed above and illustrated in FIG. 2H. More specifically, at 281, an interface is provided that prompts the user to enter the old credential at 283, which is correctly entered as "12345678", and subjected to the one-way hash and provided to the host for authentication, as explained above. At 285, the user is prompted to enter an attempt at the proposed new credential. The user enters "10 11 10 12 13 14", which is provided to the host in clear text form, and compared to the proposed new credential.

Because a match does not exist between each of the clear text elements (or individually hashed elements that are compared as explained above) of the attempted new credential and the proposed new credential, at 287, the user is provided with information that attempt was incorrect, and is also provided with a hint at 287a that identifies incorrect element. As explained above, the hint 287a is a form of feedback that is provided by the learning controller of the host based on the memory state. In this case, the learning controller determines that interface should provide the user with an indication of the location of the incorrect character in the attempted credential at 287a. Further, an instruction is provided to make the correction and complete the information. At 289, the user makes the necessary correction and enters the correct new credential as "9 11 10 12 13 14".

FIG. 2J illustrates an interface 290 that is provided to a user at a point after the user has been provided with interface 281, as discussed above and illustrated in FIG. 2I. More specifically, at 290, an interface is provided that prompts the user to enter the old credential at 291, as displayed above. Similarly, the user is prompted to attempt the proposed new credential at 292, which is provided to the host for comparison to the proposed new credential, as also explained above. At 293, an indication is provided that the user has incorrectly entered the credential, and the user is provided with hints 293a, 293b, as also explained above. At 294, the user successfully performs the necessary corrections.

Figure 2K:
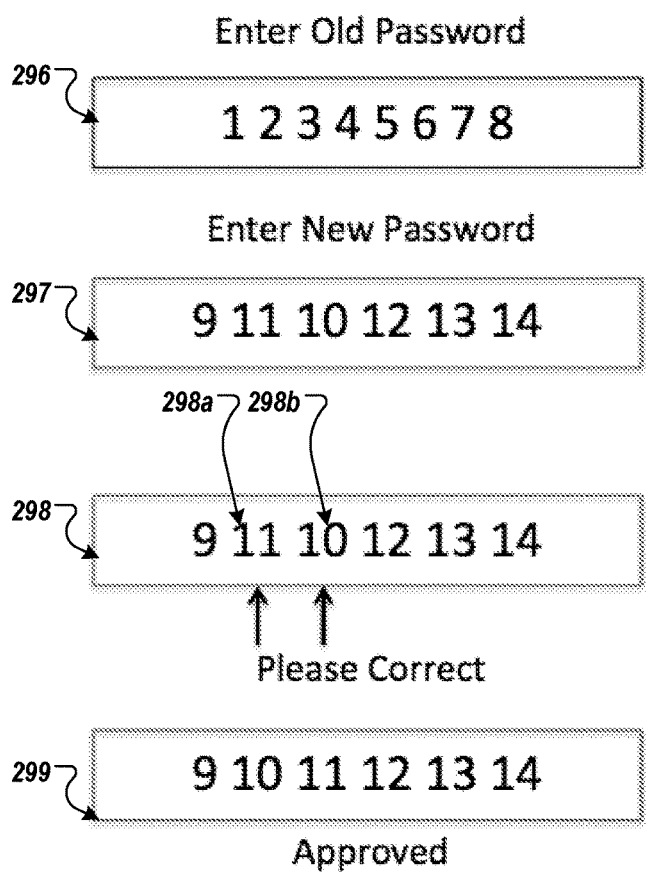

FIG. 2K illustrates an alternate interface 295 that may be provided to a user, optionally after the interface of FIG. 2J. More specifically, at 296, an interface is provided that prompts the user to enter the old credential. At 297, the user is prompted to attempt the proposed new credential, which is provided to the host for comparison to the proposed new credential. At 298, the user is provided with an indication of the corrections that need to be made in order for the credential to be correct. More specifically, an indication is provided by arrows at 298a, 298b that the elements were not correctly entered. At 299, the user has been prompted to reattempt the credential, and has done so correctly, and is given an indication of a successful attempt.

Figure 3A:
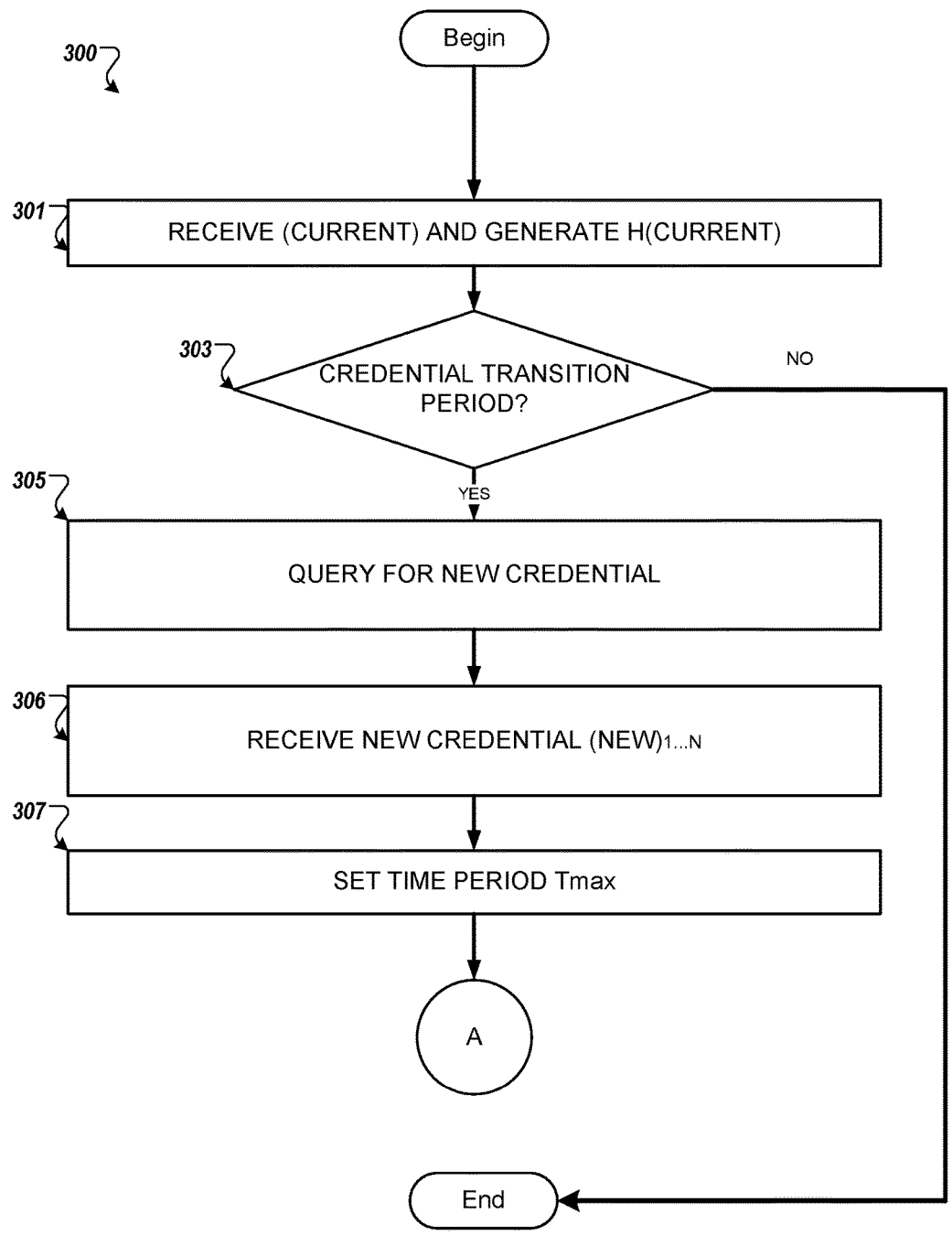
FIGS. 3A-3B shows an example process of the protocol including the client and the host according to an example implementation.
Figure 3B:
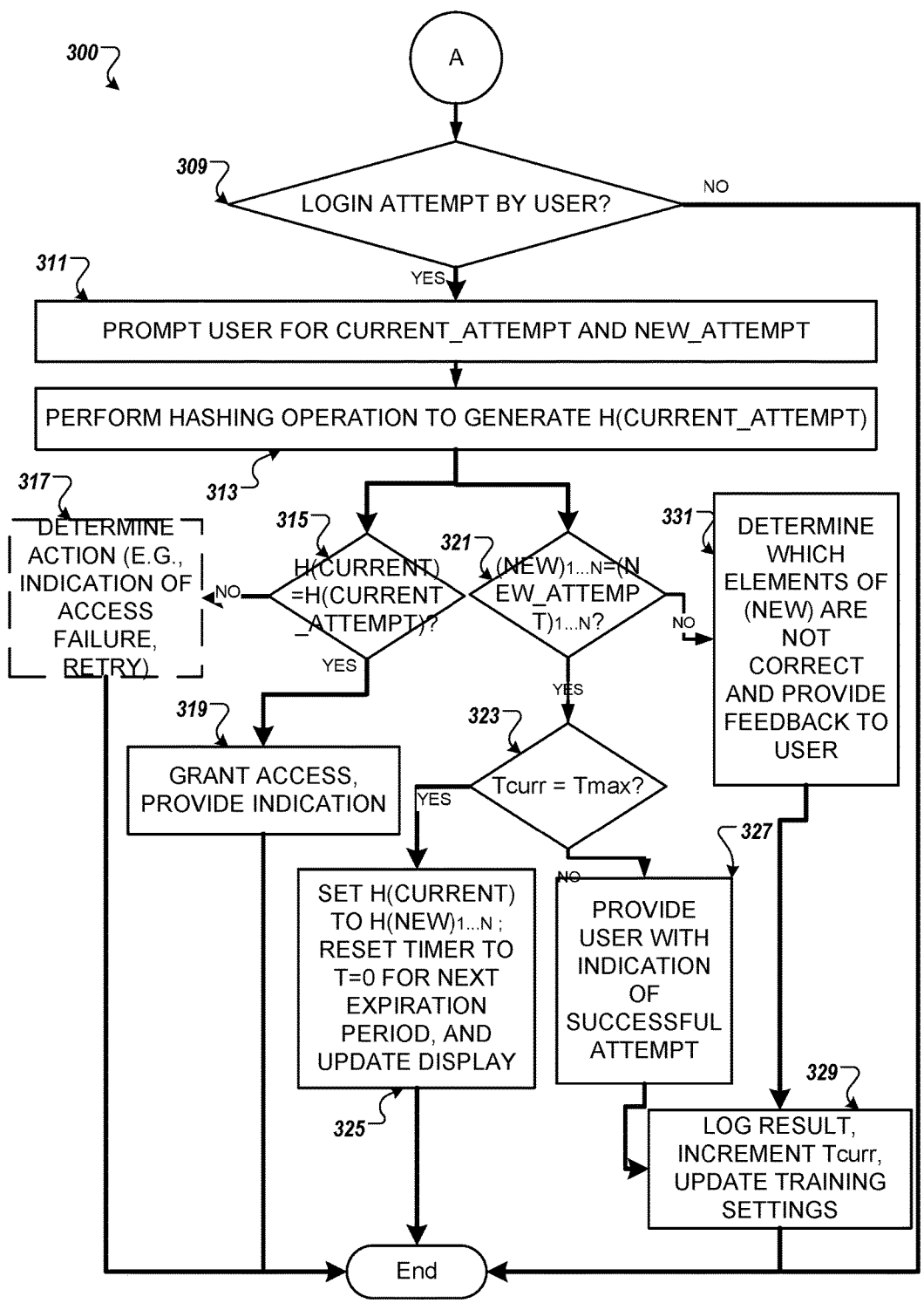

FIGS. 3A-3B shows an example process 300 of the protocol including the client and the host according to an example implementation. At 301, the current user credential is received, and a one-way hash (e.g., cryptographically strong hash) is performed on the current user credential to generate H(CURRENT). At 303, a determination is made as to whether the credential transition period has been entered.

If the result of the determination at 303 is that the credential transition period has been entered, a query for a new credential is provided at 305. For example, but not by way of limitation, an interface may be provided to the user that prompts the user to provide a proposed new credential. At 306, the proposed new credential is received as $NEW_{1...N}$, where 1 ... N represent each of the elements of the proposed new credential. At 307, a time period Tmax is set, which represents the duration of the credential transition period. The time period Tmax may be adjusted based on the memory state.

Transitioning from FIG. 3A to FIG. 3B at "A", a determination is made as to whether a login is being attempted by user at 309. If a login is being attempted, the user is prompted to provide the current credential and to attempt the new credential at 311. At 313, a hashing operation is performed on the attempted current credential to generate H(CURRENT_ATTEMPT).

At 315, a hashed version of the current credential H(CURRENT) is compared to a hashed version of the attempted current credential H(CURRENT_ATTEMPT). If there is no match, then at 317 an indication of access failure may be provided and an attempt to retry may optionally be provided to the user. The process may terminate because the login attempt was not successful.

If the hashed version of the current credential H(CURRENT) and the hashed version of the current attempted credential H(CURRENT_ATTEMPT) match, then at 319 access is granted, and an indication of successful grant of access or authentication is provided.

At 321, the elements of the proposed new credential $(NEW)_{1...N}$ are compared to the attempted new credential $(NEW\_ATTEMPT)_{1...N}$. It is noted that the comparison is performed on the clear text, as the proposed new credential and attempted new credential are not hashed, so that an element-by-element comparison can be performed for determining whether there is a match between the attempt and the proposed new credential.

Alternatively, each element of the attempted new credential may be individually hashed and provided to the host, such that a comparison is performed between the hashes of each of the individual elements of the attempted new credential $H(NEW\_ATTEMPT)_1 ... H(NEW\_ATTEMPT)_N$ and respective hashes of each of the individual elements of the proposed new credential $H(NEW)_1 ... H(NEW)_N$.

If there is a match between the proposed new credential the attempted new credential, then at 323, a determination is made as to whether current time is Tmax. If so, this is indicative of the end of the training period a successful credential attempt. Accordingly, at 325 proposed new credential is hashed as H(NEW) and provided as the current hashed credential. Further the timer is reset, and an updated display is provided, including an indication that credential has been changed.

If it is determined that the current time is not Tmax at 323, then the training period has not expired at 327, the user is provided with an indication of a successful credential attempt, and at 329, the result is provided to the host, such that the memory state may be adjusted, the current time is incremented, and the learning controller may update the training sets. For example, Tmax may be shortened, the training hint may be changed, or other action may be taken in accordance with the successful attempt.

If it is determined at 321 that each of the elements of the proposed new credential $(NEW)_{1...N}$ do not match the new credential attempt $(NEW\_ATTEMPT)_{1...N}$, at 331 a determination is made as to which of the elements are not correct, and feedback is provided to the user, for example in the form of a training hint. As explained above, the training hint may be determined by the learning controller, based on the current memory state. At 329, the memory state is updated, the timer is incremented, and training settings are updated, as explained above. For example, Tmax may be extended if additional time is required for user to learn the credential, based on the current memory state.

Figure 4A:
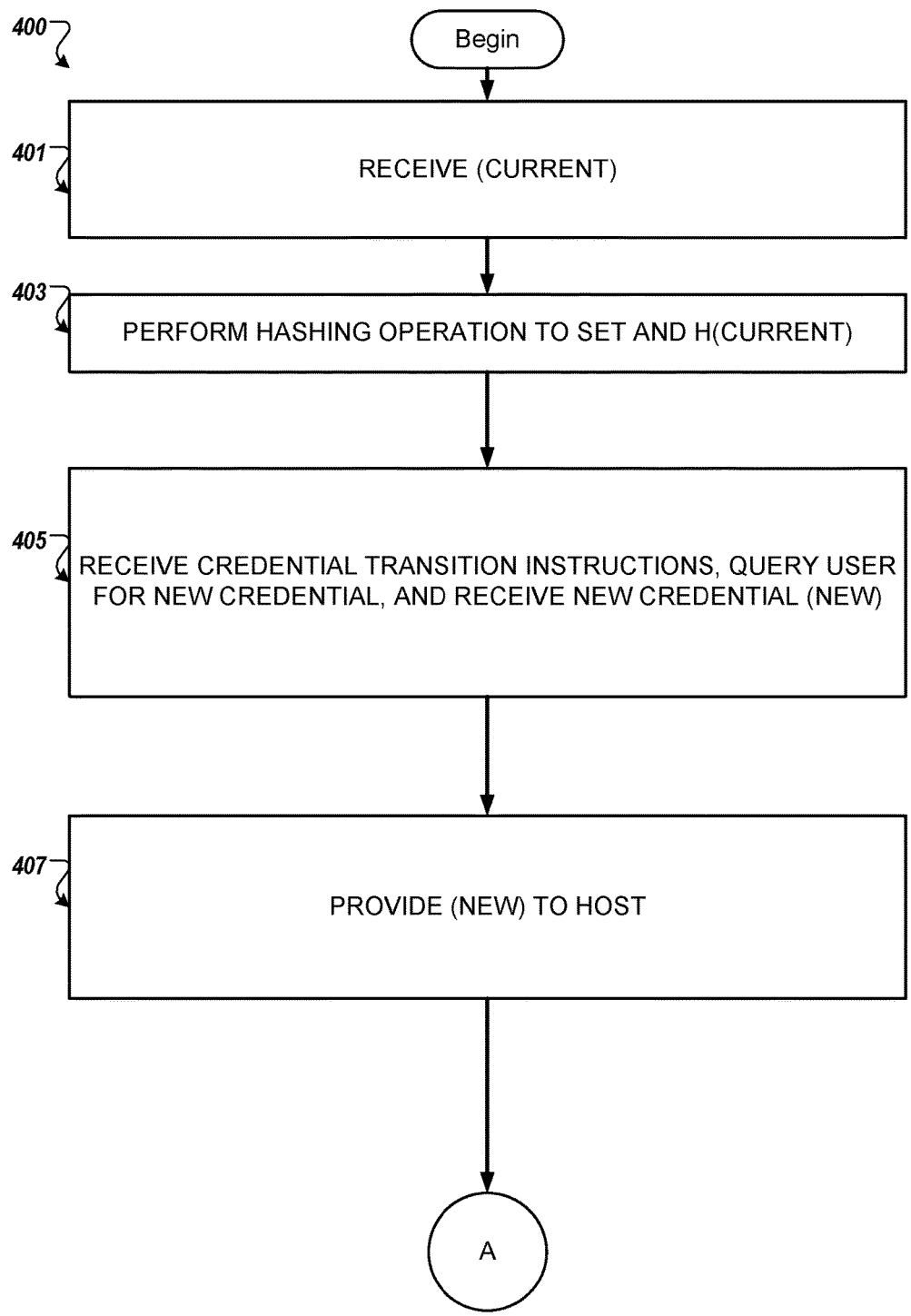
FIGS. 4A-4B shows an example process of the protocol including the client according to an example implementation.
Figure 4B:
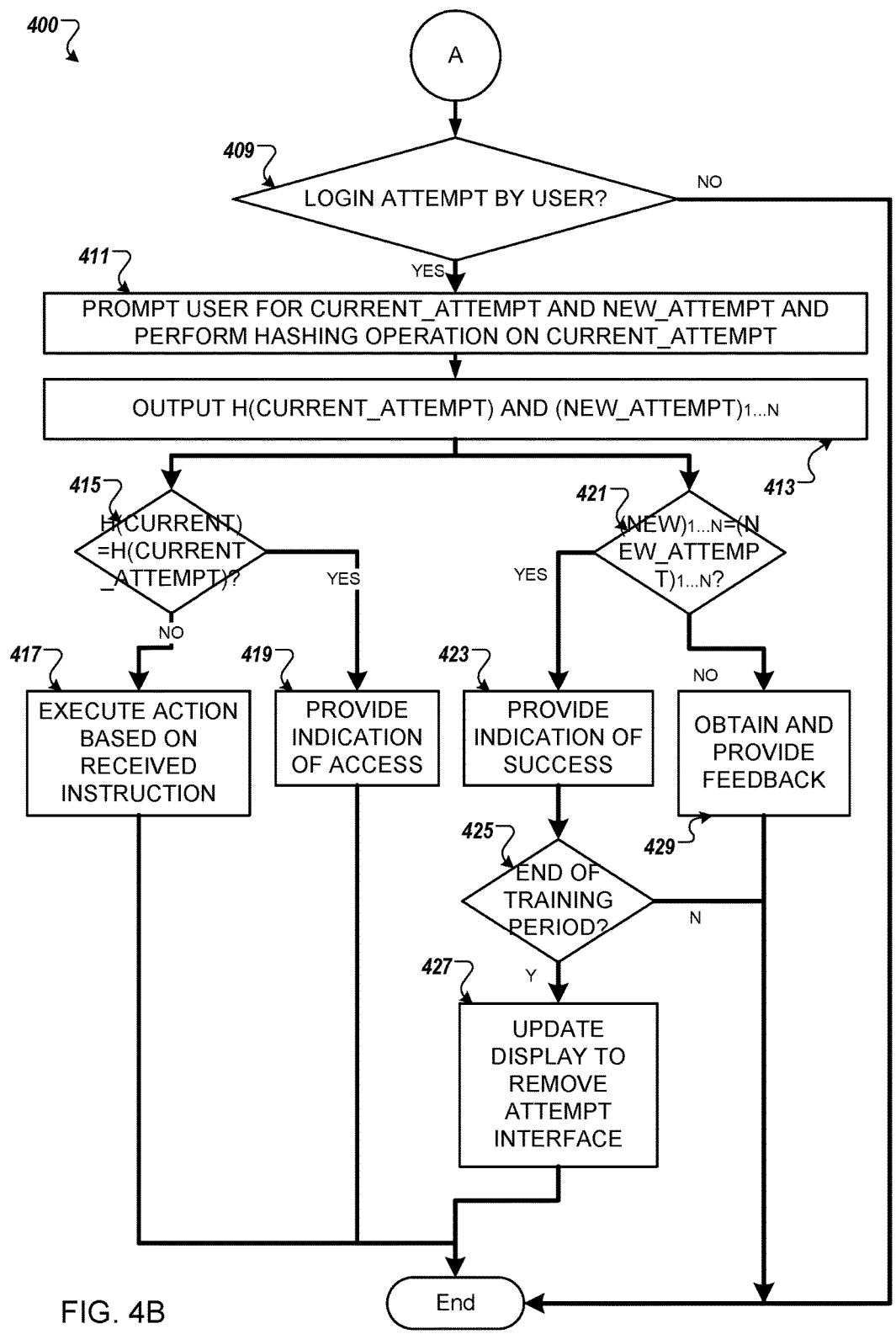

FIGS. 4A-4B shows an example process 400 of the protocol including the client according to an example implementation. Operations of the example process 400 associated with the client may be performed, for example but not by way of limitation, in association with host-based processes as well.

As shown in 401, the client may receive an attempt to enter a current credential. For example, but not by way of limitation, and as described above, the attempted credential may take the form of characters provided by the user via an interface, a biometric input associated with the user, or other user generated credential.

At 403, the client performs a hashing operation (e.g., cryptographically strong hash) on the credential that was provided by the user. The result of the hashing operation is output, and for example, provided to a host.

At 405, the client receives credential transition instructions, which indicate to the client that there is a new credential training period. In response to the credential transition instructions, the client provides an interface, such that a user can enter a proposed new credential. Once the proposed new credential is entered by the user, it may also be output, and provided to the host, for example at 407. The proposed new credential is received, processed, stored and output on an element by element basis as clear text. Alternatively, each element of the attempted new credential may be individually hashed and provided to the host, such that a comparison is performed between the hashes of each of the individual elements of the attempted new credential and respective hashes of each of the individual elements of the proposed new credential.

Transitioning to FIG. 4B at "A", at 409, client determines whether the user is attempting to log in. For example, but not by way of limitation, this information may be provided by a user action, such as a user attempting to open an online application, the user following a URL or link to a specific website, or other attempt to access a login screen, as would be known to those skilled in the art.

At 411, the client provides a prompt to the user, such that the user can attempt the current credential, as well as attempting the new credential. Once the current credential attempt and the new credential attempt have been received, a hashing operation is performed on the current credential attempt. The new credential attempt, and optionally the current credential attempt, is received and processed on an element by element basis.

At 413, the client outputs a hash of the current attempt, along with the clear text of the new credential attempt, including each and every element of the clear text of the new credential attempt. For example, but not by way of limitation, and as explained above, the output may be transmitted to the host. Alternatively, client may individually hash and provide to the host each element of the attempted new credential, such that the host may compare the hashes of each of the individual elements of the attempted new credential and respective hashes of each of the individual elements of the proposed new credential.

At 415, a comparison is performed between the hash of the current credential and the hash of the current attempt. Optionally, the comparison may be performed at host, or alternatively, at the client or other location.

If the hash of the current credential is not match the hash of the current attempt in 415, then at 417, and action is executed based on a received instruction. For example, an indication may be provided to the user that the attempt was not successful, the user may be provided with an opportunity to make another attempt, a security report may be provided to an external party such as a security agency with the consent of the user prior to the attempt, or the account may be restricted or closed to further attempts, as is known to those skilled in the art.

If the hash of the current credential matches the hash of the current attempt, then at 419, the client provides an indication of access. For example, this may be an interface such as a pop-up window, or other indication to the user that the current credential attempt was successful. Separately, the host can provide access based on this result.

At 421, and either before, during or after 415, each clear text element of the proposed new credential is compared to each clear text element of the attempted new credential. Alternatively, each element of the attempted new credential may be individually hashed and provided to the host, such that a comparison is performed between the hashes of each of the individual elements of the attempted new credential and respective hashes of each of the individual elements of the proposed new credential. Optionally, the comparison may be performed at host, or alternatively, at the client or other location. If each of the elements match, then at 423, the client provides the user with an indication that the attempt to enter the new credential was successful. At 425, a determination is made as to whether the training period has expired. Optionally, this operation may be performed at the client or at the host.

If it is determined at 425 that the end of the training period has been reached, and in view of the successful credential attempt per operations 421 and 423, operation 427 is performed, in which the client updates the interface that is provided to the user, to remove the portion of the interface that provides the user with the opportunity to attempt the new credential.

If a determination is made in operation 421 that one or more of the clear text elements of the proposed new credential does not match the clear text elements of the attempted new credential (or alternatively, individual respective hashed elements of each of the proposed new credential and the attempted new credential do not match), then at 429, the client receives feedback, and provides the feedback in the interface. More specifically, the feedback may include a training hint, as explained above. Because the attempt was not successful, the training period does not end, and is either continued or extended, for example at the host side, until the conditions for termination of the training period have been met, as also explained above.

Figure 5A:
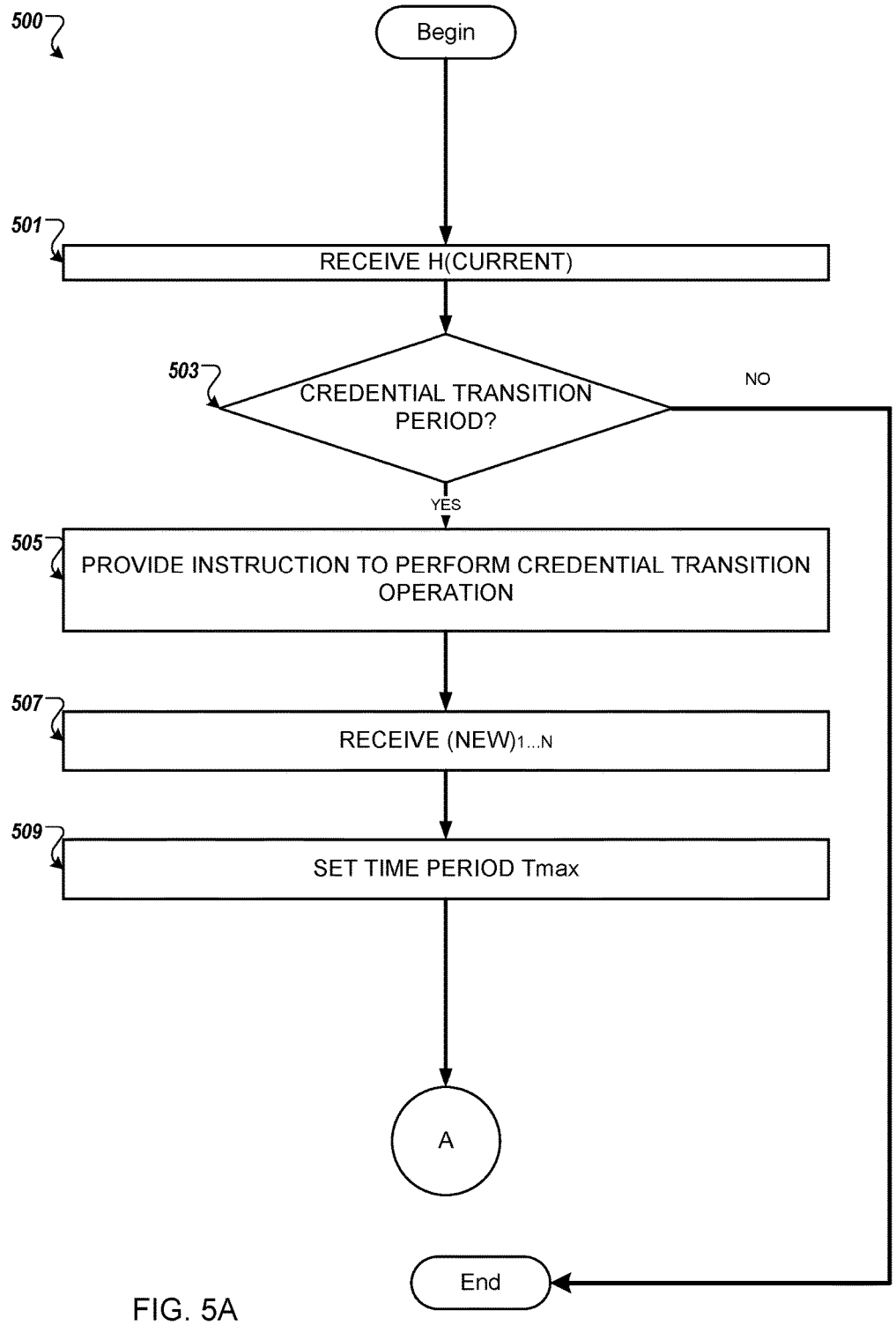
FIGS. 5A-5B shows an example process of the protocol including the host according to an example implementation.
Figure 5B:
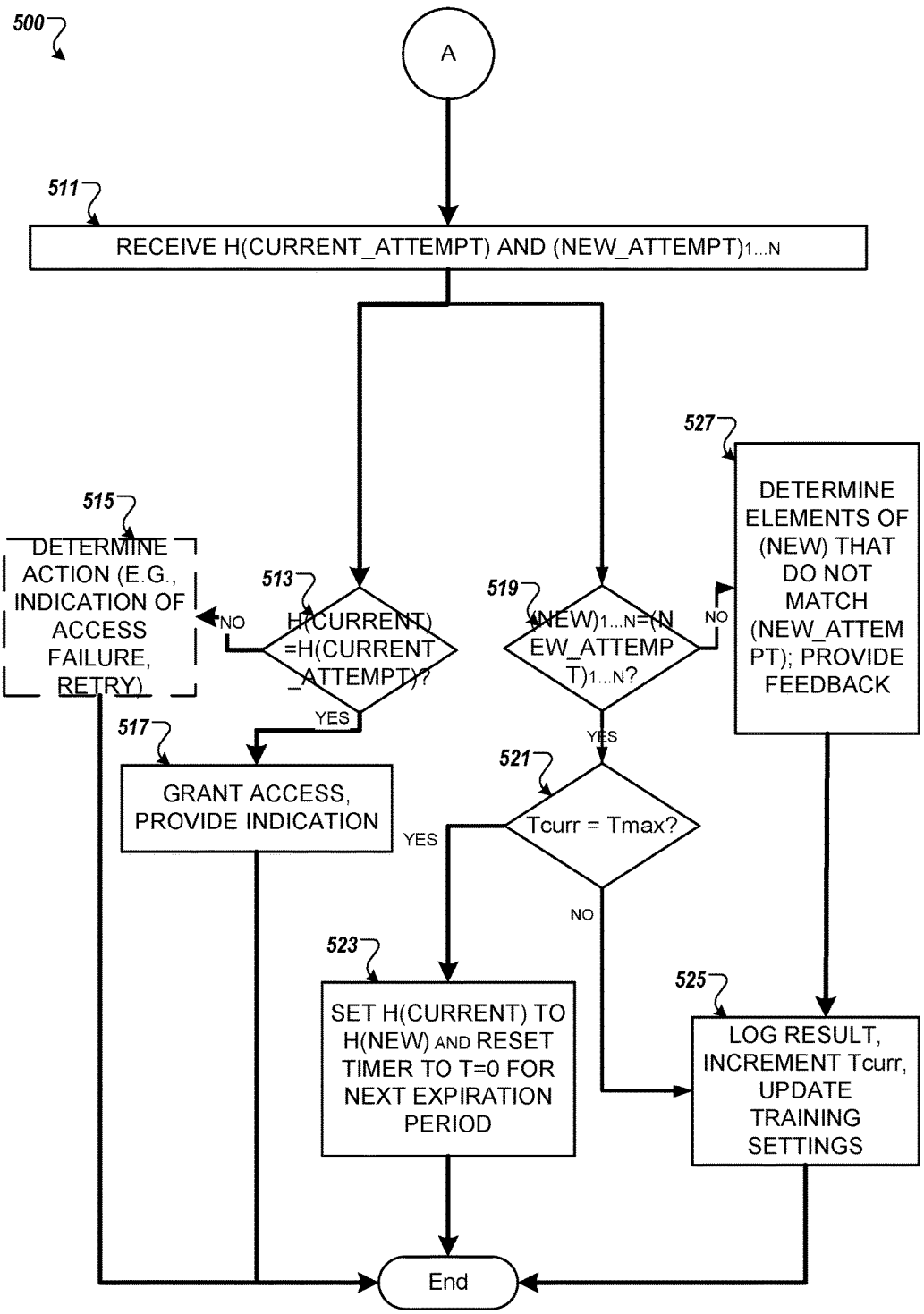

FIGS. 5A-5B shows an example process of the protocol including the host according to an example implementation. Operations of the example process 500 associated with the host may be performed, for example but not by way of limitation, in association with client-based processes as well.

At 501, the host may receive a hash (e.g., cryptographically strong hash) of the current credential. For example, the hash of the current credential may be provided by the client, such that the host can store the hash of the current credential, and use the stored hash for comparison to a hash of a current credential attempt.

At 503, a determination is made as to whether a credential transition period has begun. For example, the credential transition period may be set based on a calendar date on a periodic basis, and amount of time that has expired since the last transition period, a number of attempts and or logins that have been performed, or other manner of period determination, as would be understood by those skilled in the art.

For a determination that the credential transition period has begun at 503, the host may provide an instruction at 505 to perform a credential transition operation. For example, but not by way of limitation, this instruction may be provided by the host to the client.

At 507, the host receives $(NEW)_{1\ldots N}$, in clear text form, which is the elements of a proposed new credential. This information may be received, for example, from the client that receives the instruction to perform the credential transition operation. At 509, the host sends a time period Tmax that is associated with a length of the credential transition period. Alternatively, each element of the attempted new credential may be individually hashed and provided to the host, such that a comparison is performed between the hashes of each of the individual elements of the attempted new credential $H(NEW\_ATTEMPT)_1 \ldots H(NEW\_ATTEMPT)_N$ and respective hashes of each of the individual elements of the proposed new credential $H(NEW)_1 \ldots H(NEW)_N$.

Transitioning to FIG. 5B at "A", at 511, the host receives a hashed current credential attempt H(CURRENT_ATTEMPT) as well as the clear text of the elements of a new credential attempt $(NEW\_ATTEMPT)_{1\ldots N}$. Alternatively, the host may receive hashes of each of the individual elements of the attempted new credential $H(NEW\_ATTEMPT)_1 \ldots H(NEW\_ATTEMPT)_N$, to be compared to respective hashes of each of the individual elements of the proposed new credential $H(NEW)_1 \ldots H(NEW)_N$ previously stored in the host.

At 513, an operation is performed to compare a hash of the current credential H(CURRENT) with a hash of the attempted current credential H(CURRENT_ATTEMPT). The host either does not receive the clear text of either of these hashes. A determination is made as to whether the hashes match one another.

If there is not a match, at 515, the host determines an action to be taken. As explained above, the action may include, but is not limited to, providing an indication of access failure, permitting another attempt, locking the account, notifying irrelevant information security authority, or other action as may be known to those skilled in the art that may be taken when a credential attempt is not successful.

If there is a match, at 517, the host grants access and generates an indication that is provided to the client.

At 519, an operation is performed to compare the clear text of the proposed new credential $(NEW)_{1\ldots N}$ with the attempted new credential $(NEW\_ATTEMPT)_{1\ldots N}$. the comparison is performed on an element by element basis. Alternatively, each element of the attempted new credential may be individually hashed and provided to the host, such that a comparison is performed between the hashes of each of the individual elements of the attempted new credential $H(NEW\_ATTEMPT)_1 \ldots H(NEW\_ATTEMPT)_N$ and respective hashes of each of the individual elements of the proposed new credential $H(NEW)_1 \ldots H(NEW)_N$. It is noted that operation 519 may be performed substantially concurrently with, before or after operation 513.

If operation 519 provides a determination that each element of the proposed new credential $(NEW)_{1\ldots N}$ matches the attempted new credential $(NEW\_ATTEMPT)_{1\ldots N}$, this result is indicative of a user having successfully attempted their proposed new credential correctly. At 521, the host determines whether the current time Tcurr is the length of the time period for the credential transition period. If so, then the current credential is replaced with the proposed new credential. More specifically a hash of the current credential H(CURRENT) is replaced by a hash of the proposed new credential received from the client H(NEW). Further, a timer is reset (e.g., to T=0), such that a next expiration period for the credential may start.

If it is determined that the credential transition period has not expired, then at 525, the result of a successful new credential attempt is logged, the timer Tcurr is incremented, and training settings are updated. For example, the host may determine that the credential transition period is shortened after a number of consecutive successful credential attempts. Similarly, the training hints associated with an unsuccessful credential attempt may increase in terms of the degree of difficulty when there have been more successful credential attempts. Further, properties associated with the user may be considered when making a determination to update training settings.

If the result of the determination at operation 519 is that each of the elements of the proposed new credential $(NEW)_{1 \ldots N}$ do not match each of the elements of the attempted new credential $(NEW\_ATTEMPT)_{1 \ldots N}$, then the flow proceeds to 527. At 527, a determination is made as to which of the elements and how many of the elements do not match. Based on the result of this determination, and in association with the current memory state as determined at 525 as explained above, feedback is provided, optionally in the form of a training hint. The training hint may be determined based on a past number of successful or unsuccessful attempts, whether the same or different elements were unsuccessfully attempted in the past, characteristics of the account associated with the credentials, the degree of difficulty of the proposed new credential, the amount of time that has expired since the start of the credential transition period, or other information. After 527, operation 525 is performed as explained above.

Figure 6:
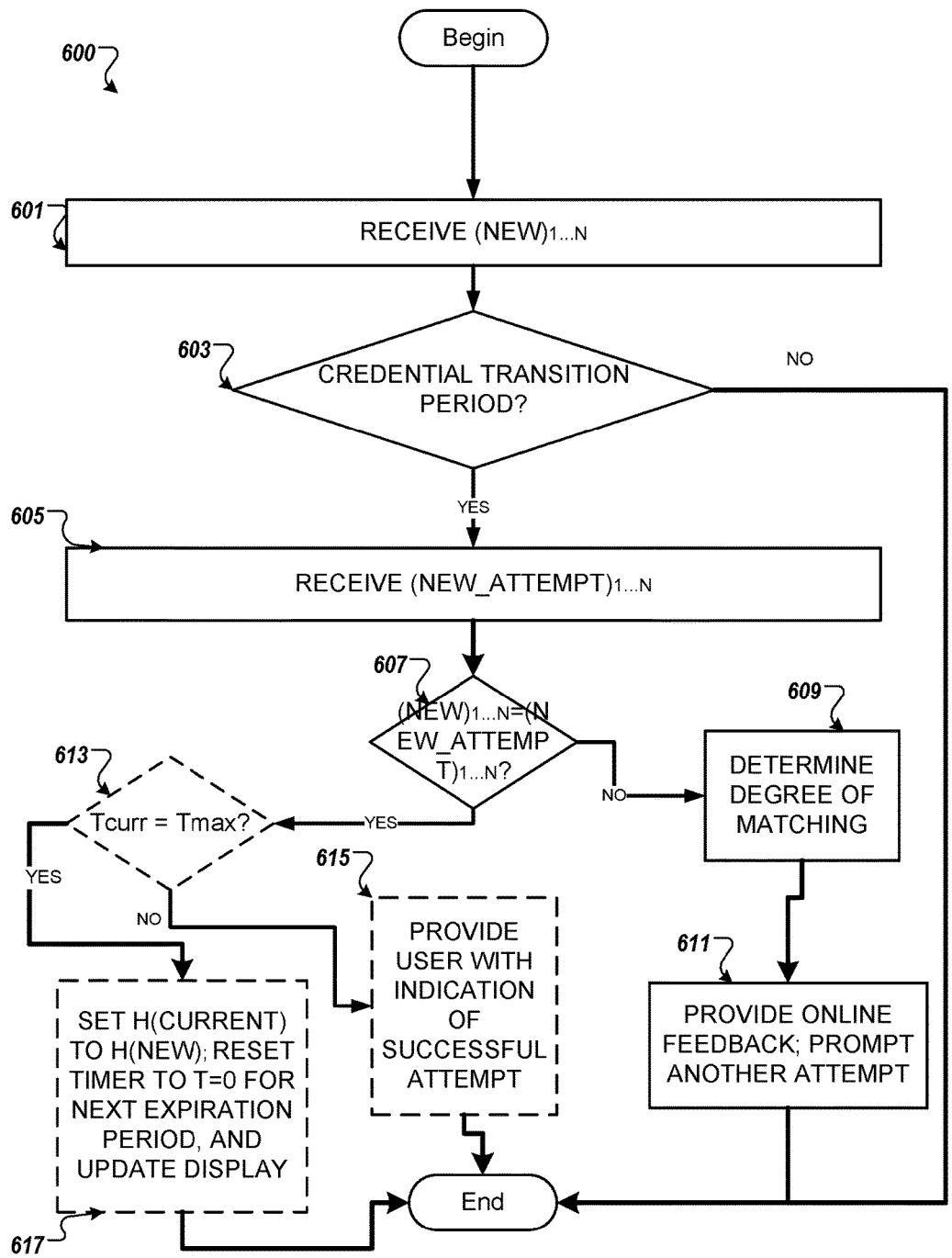
FIG. 6 shows an example process of the protocol according to another example implementation.

FIG. 6 shows an example process 600 of the protocol including the client according to an example implementation.

In the foregoing example implementations, various operations are described as being performed at the client or at the host. However, the present inventive concept is not limited thereto, and other implementations may be substituted therefor. For example, but not by way of limitation, operations that have been indicated as being performed at the client may optionally be performed at the host instead, and vice versa, as would be understood by those skilled in the art.

At 601, elements of a proposed new credential $(NEW)_{1 \ldots N}$ are received. The elements are received as clear text. At 603, a determination is made as to whether a credential transition period has begun. If it is determined that the credential transition period has begun at 603, then elements of a new credential attempt $(NEW\_ATTEMPT)_{1 \ldots N}$ are received at 605. As was the case with the proposed new credential $(NEW)_{1 \ldots N}$, the new credential attempt $(NEW\_ATTEMPT)_{1 \ldots N}$ is also received with each of the elements being in clear text. Alternatively, each element of the attempted new credential may be individually hashed and provided to the host, such that a comparison is performed between the hashes of each of the individual elements of the attempted new credential $H(NEW\_ATTEMPT)_1 \ldots H(NEW\_ATTEMPT)_N$ and respective hashes of each of the individual elements of the proposed new credential $H(NEW)_1 \ldots H(NEW)_N$.

At 607, a determination is made as to whether the elements of the proposed new credential $(NEW)_{1 \ldots N}$ match the elements of the new credential attempt $(NEW\_ATTEMPT)_{1 \ldots N}$ on an element by element basis.

For the determination that the elements do not match in 607, at 609, a degree of matching is determined. For example, but not by way of limitation, the degree of matching may include determining how many elements do not match, which of the elements do not match, a position or other identifying characteristic of the nonmatching elements, relative to one another, a trend based on historical data associated with the account of the user.

At 611, feedback is generated and provided online. More specifically, the feedback relates to a training hint that provides the user with assistance to learn to memorize the new credential more quickly. The degree of matching is considered in determining the training hint to be provided. Additionally, an indication is provided to prompt the user to make another attempt.

On the other hand, if the determination at 607 indicates that the elements are matching, then optionally, operations 613, 615 and 617 may be performed. More specifically, at 613, the host determines whether the current time Tcurr is the length of the time period for the credential transition period Tmax.

If so, then at 617 the current credential is replaced with the proposed new credential. More specifically a hash (e.g., cryptographically strong hash) of the current credential H(CURRENT) is replaced by a hash of the proposed new credential received from the client H(NEW). Further, a timer is reset (e.g., to T=0), such that a next expiration period for the credential may start.

If the result of the determination at operation 613 is that the credential transition period has not expired, the host determines an action to be taken. Further, at 615, the user is provided with an indication that the attempt was successful. Optionally, the timer Tcurr may be incremented, and training settings may be updated. For example, the host may determine that the credential transition period is shortened after a number of consecutive successful credential attempts. Similarly, the training hints associated with an unsuccessful credential attempt may increase in terms of the degree of difficulty when there have been more successful credential attempts. Further, properties associated with the user may be considered when making a determination to update training settings.

Figure 7B:
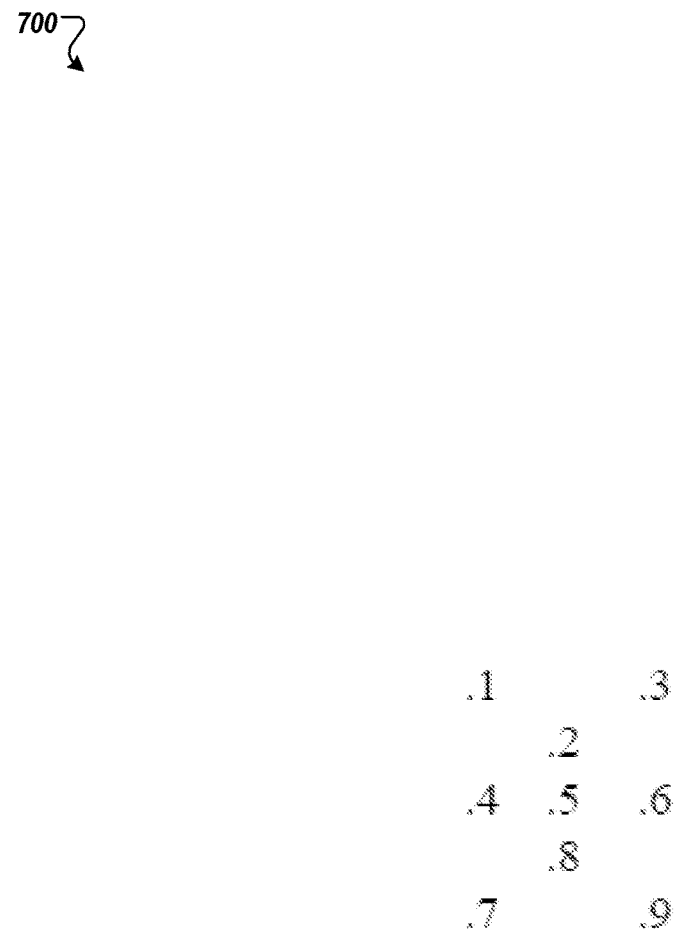

FIGS. 7A-7B shows another example for the protocol according to the example implementation involving gestures. Gestures are part of motion memory of the motoric nervous system. According to the example implementations, a very gradually incremental change of location of dots on a panel may be provided. Thus, an automatic reflexive gesture may be trained on slowly changing dot panel.

As shown in the illustration of FIG. 7A, a simple dot panel of a user interface is provided. In this example, a user may access one or more of the dots in the panel in sequence to generate a gesture, which can be used as a credential. For example, one gesture may be 1→5→9→8→7.

As shown in FIG. 7B, the dots may subsequently deviate. However, the user continues to follow the same proposed new credential. In the actual implementation when the system is not in the credential transition period, the dots may deviate from one state to another drastically or sharply without any transition. However, during a credential transition period, while the user is practicing a new gesture as the credential, the panel of dots will deviate gradually and slowly.

Accordingly, the user may learn to put a gesture in a more complicated dot panel that can vary randomly with each new session. Because the dots will vary randomly and the gesture of the user will vary randomly each time the user attempts the gesture successfully, it becomes more difficult for a bad actor to make a movie of gestures that will permit guessing of the credential, because since the motions are not persistent over time.

Figure 8:
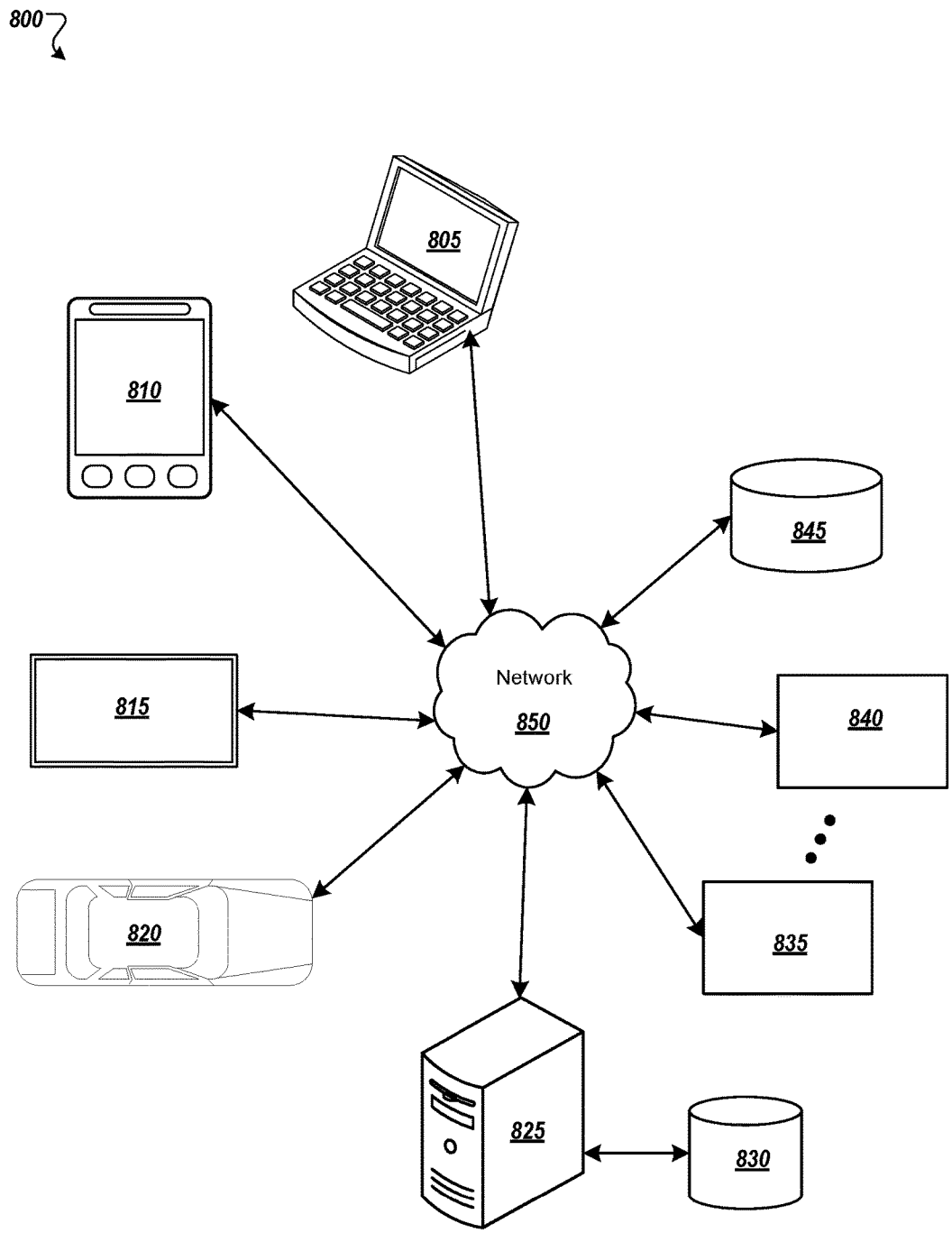
FIG. 8 shows an example environment suitable for some example implementations.

FIG. 8 shows an example environment suitable for some example implementations. Environment 800 includes devices 805-845, and each is communicatively connected to at least one other device via, for example, network 860 (e.g., by wired and/or wireless connections). Some devices may be communicatively connected to one or more storage devices 830 and 845.

An example of one or more devices 805-845 may be computing devices 905 and/or 1005 described below in FIGS. 9 and 10, respectively. Devices 805-845 may include, but are not limited to, a computer 805 (e.g., a laptop computing device), a mobile device 810 (e.g., smartphone or tablet), a television 815, a device associated with a vehicle 820, a host computer 825, computing devices 835-840, storage devices 830 and 845. The example implementation may also be used in a mobile computing application. For example, a user may, via a sensitive panel, control one or more devices or gadgets.

In some implementations, devices 805-820 may be considered user devices associated with the users of the enterprise (e.g., devices used by users to access services and/or issue requests, such as on a social network, or to access their personal online information while within the firewall of the enterprise). Devices 825-845 may be devices associated with service providers (e.g., used by the external host to provide services as described above and with respect to FIGS. 3-6, and/or store data, such as webpages, text, text portions, images, image portions, audios, audio segments, videos, video segments, and/or information thereabout).

For example, a user (e.g., Alice) may require a credential access, view, and/or share personal content, using user device 805 or 810 on a network supported by one or more devices 825-845. A recipient that is the external host (e.g., Bob) may wish to control or grant access and/or view to Alice for an online application or service, for example, using device 815 or 820, in accordance with the process described above with respect to FIGS. 3-6.

Figure 9:
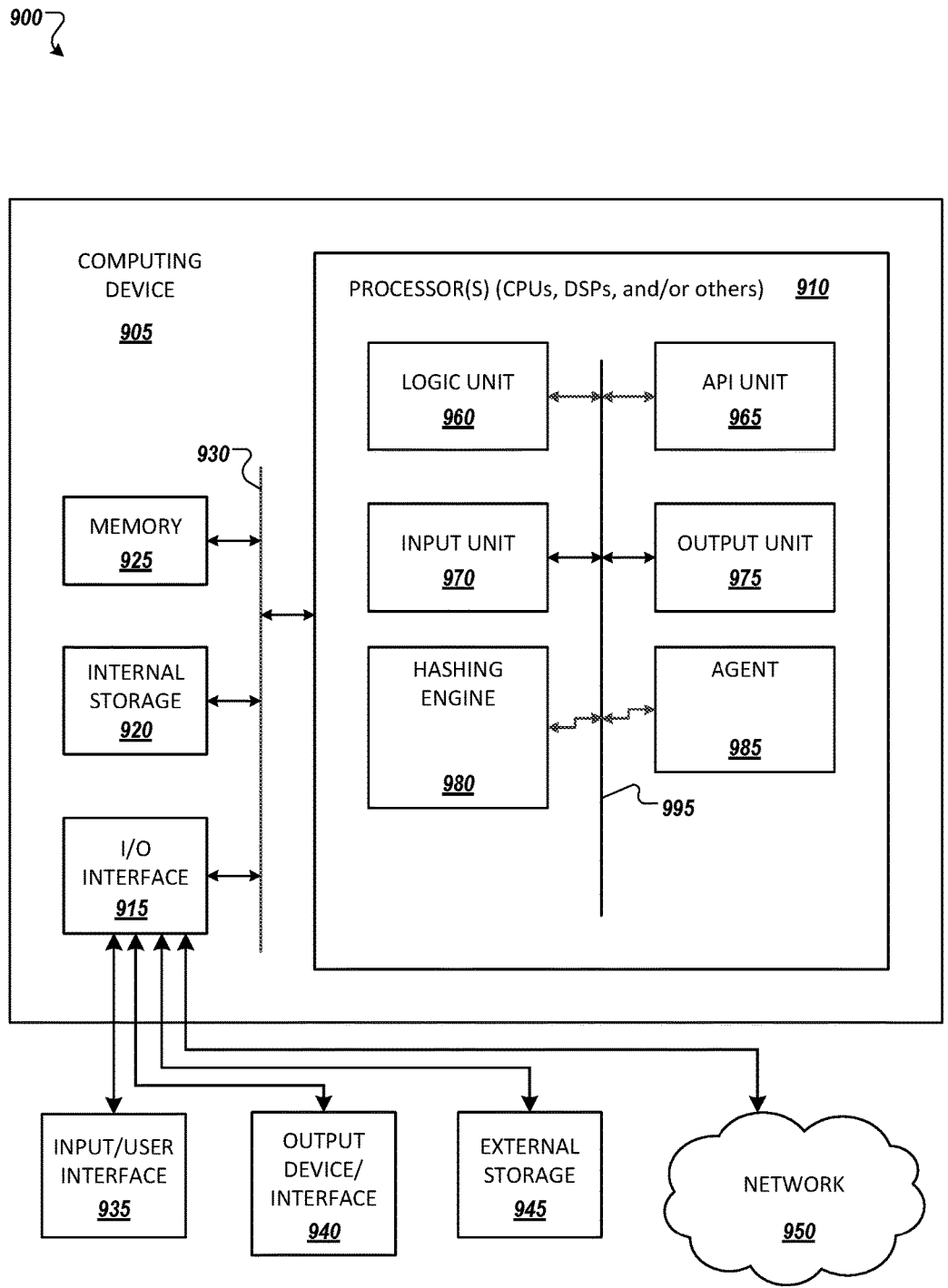
FIG. 9 shows an example computing environment with an example computing device associated with the client for use in some example implementations.

FIG. 9 shows an example computing environment with an example client computing device associated with the external host for use in some example implementations. Computing device 905 in computing environment 900 can include one or more processing units, cores, or processors 910, memory 915 (e.g., RAM, ROM, and/or the like), internal storage 920 (e.g., magnetic, optical, solid state storage, and/or organic), and/or I/O interface 925, any of which can be coupled on a communication mechanism or bus 930 for communicating information or embedded in the computing device 905.

Computing device 905 can be communicatively coupled to input/user interface 935 and output device/interface 940. Either one or both of input/user interface 935 and output device/interface 940 can be a wired or wireless interface and can be detachable. Input/user interface 935 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 940 may include a display, television, monitor, printer, speaker, braille, or the like. In some example implementations, input/user interface 935 and output device/interface 940 can be embedded with or physically coupled to the computing device 905. In other example implementations, other computing devices may function as or provide the functions of input/user interface 935 and output device/interface 940 for a computing device 905.

Examples of computing device 905 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 905 can be communicatively coupled (e.g., via I/O interface 925) to external storage 945 and network 950 for communicating with any number of networked components, devices, and systems, including one or more computing devices of the same or different configuration. Computing device 905 or any connected computing device can be functioning as, providing services of, or referred to as a server, client, thin server, general machine, special-purpose machine, or another label.

The I/O interface 925 may include wireless communication components (not shown) that facilitate wireless communication over a voice and/or over a data network. The wireless communication components may include an antenna system with one or more antennae, a radio system, a baseband system, or any combination thereof. Radio frequency (RF) signals may be transmitted and received over the air by the antenna system under the management of the radio system.

I/O interface 925 can include, but is not limited to, wired and/or wireless interfaces using any communication or I/O protocols or standards (e.g., Ethernet, 902.11x, Universal System Bus, WiMax, modem, a cellular network protocol, and the like) for communicating information to and/or from at least all the connected components, devices, and network in computing environment 900. Network 950 can be any network or combination of networks (e.g., the Internet, local area network, wide area network, a telephonic network, a cellular network, satellite network, and the like).

Computing device 905 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 905 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 910 can execute under any operating system (OS) (not shown), in a native or virtual environment. One or more applications can be deployed that include logic unit 960, application programming interface (API) unit 965, input unit 970, output unit 975, hashing engine 980, agent 985, and inter-unit communication mechanism 995 for the different units to communicate with each other, with the OS, and with other applications (not shown). For example, hashing engine 980 and agent 985 may implement one or more processes shown in FIGS. 3-6. The described units and elements can be varied in design, function, configuration, or implementation and are not limited to the descriptions provided.

In some example implementations, when information or an execution instruction is received by API unit 965, it may be communicated to one or more other units (e.g., logic unit 960, input unit 970, output unit 975, hashing engine 980, agent 985).

For example, after input unit 970 has received the outgoing data that is associated with outgoing information of a member of the client, input unit 970 may use API unit 965 to communicate the user input (e.g., current credential attempt) to hashing agent 980. For example, hashing agent 980 may receive the current credential attempt and perform a hashing operation to generate a hash of the current credential attempt. Similarly, when it is determined that the proposed new credential replaces the current credential, the hashing engine may generate a hash of the proposed new credential. Hashing engine 980 may, via API unit 965, interact with the agent 985 to provide the hash to the host.

In some instances, logic unit 960 may be configured to control the information flow among the units and direct the services provided by API unit 965, input unit 970, output unit 975, hashing engine 980, agent 985, decryption and matching unit 990 and action determination unit 993 in some example implementations described above. For example, the flow of one or more processes or implementations may be controlled by logic unit 960 alone or in conjunction with API unit 965.

Figure 10:
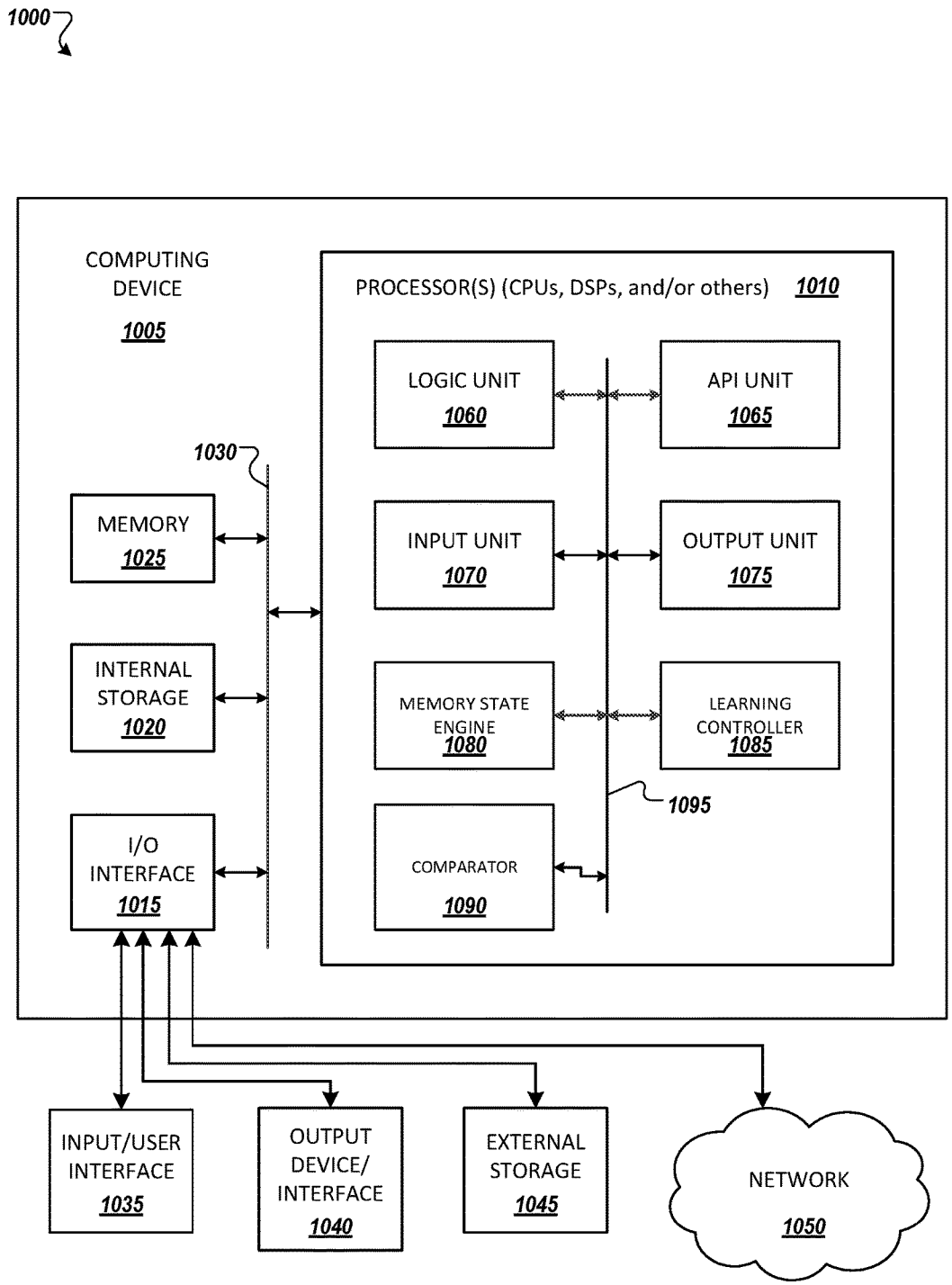
FIG. 10 shows an example computing environment with an example computing device associated with the host for use in some example implementations.

FIG. 10 shows an example computing environment with an example host computing device associated with the enterprise for use in some example implementations. Computing device 1005 in computing environment 1000 can include one or more processing units, cores, or processors 1010, memory 1015 (e.g., RAM, ROM, and/or the like), internal storage 1020 (e.g., magnetic, optical, solid state storage, and/or organic), and/or I/O interface 1025, any of which can be coupled on a communication mechanism or bus 1030 for communicating information or embedded in the computing device 1005.

Computing device 1005 can be communicatively coupled to input/user interface 1035 and output device/interface 1040. Either one or both of input/user interface 1035 and output device/interface 1040 can be a wired or wireless interface and can be detachable. Input/user interface 1035 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1040 may include a display, television, monitor, printer, speaker, braille, or the like. In some example implementations, input/user interface 1035 and output device/interface 1040 can be embedded with or physically coupled to the computing device 1005. In other example implementations, other computing devices may function as or provide the functions of input/user interface 1035 and output device/interface 1040 for a computing device 1005.

Examples of computing device 1005 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 1005 can be communicatively coupled (e.g., via I/O interface 1025) to external storage 1045 and network 1050 for communicating with any number of networked components, devices, and systems, including one or more computing devices of the same or different configuration. Computing device 1005 or any connected computing device can be functioning as, providing services of, or referred to as a server, client, thin server, general machine, special-purpose machine, or another label.

The I/O interface 1025 may include wireless communication components (not shown) that facilitate wireless communication over a voice and/or over a data network. The wireless communication components may include an antenna system with one or more antennae, a radio system, a baseband system, or any combination thereof. Radio frequency (RF) signals may be transmitted and received over the air by the antenna system under the management of the radio system.

I/O interface 1025 can include, but is not limited to, wired and/or wireless interfaces using any communication or I/O protocols or standards (e.g., Ethernet, 1002.11x, Universal System Bus, WiMax, modem, a cellular network protocol, and the like) for communicating information to and/or from at least all the connected components, devices, and network in computing environment 1000. Network 1050 can be any network or combination of networks (e.g., the Internet, local area network, wide area network, a telephonic network, a cellular network, satellite network, and the like).

Computing device 1005 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 1005 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1010 can execute under any operating system (OS) (not shown), in a native or virtual environment. One or more applications can be deployed that include logic unit 1060, application programming interface (API) unit 1065, input unit 1070, output unit 1075, memory state engine 1080, learning controller 1085, comparator 1090, and inter-unit communication mechanism 1095 for the different units to communicate with each other, with the OS, and with other applications (not shown). For example, memory state engine 1080, learning controller 1085, and comparator 1090 may implement one or more processes shown in FIGS. 3-6. The described units and elements can be varied in design, function, configuration, or implementation and are not limited to the descriptions provided.

In some example implementations, when information or an execution instruction is received by API unit 1065, it may be communicated to one or more other units (e.g., logic unit 1060, input unit 1070, output unit 1075, memory state engine 1080, learning controller 1085, and comparator 1090).

For example, after input unit 1070 has received a hash of a current credential and/or clear text of a proposed new credential, from the client, input unit 1070 may use API unit 1065 to communicate this information to memory 1025. Subsequently, after input unit 1070 has received a hash of a current credential attempt and/or clear text of a new credential attempt from the client, input unit 1070 may use API unit 1065 to communicate this information to comparator 1090, which compares the hash of the current credential to the current credential attempt, as well as comparing the clear text of the proposed new credential to the clear text of the new credential attempt. Alternatively, each element of the attempted new credential may be individually hashed and provided to the host, such that a comparison is performed between the hashes of each of the individual elements of the attempted new credential and respective hashes of each of the individual elements of the proposed new credential.

Memory state engine 1080 may, via API unit 1065, interact with the learning controller 1085 to generate a training hint and to update a memory state based on the information received from the input unit 1070 and the information in the memory 1025. Using API unit 1065, learning controller 1090 may determine a training hint to be provided when a proposed new credential does not match a new credential attempt.

In some instances, logic unit 1060 may be configured to control the information flow among the units and direct the services provided by API unit 1065, input unit 1070, output unit 1075, memory state engine 1080, learning controller 1085, and comparator 1090 in some example implementations described above. For example, the flow of one or more processes or implementations may be controlled by logic unit 1060 alone or in conjunction with API unit 1065.

Any of the software components described herein may take a variety of forms. For example, a component may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, as a web-enabled software application, and/or as a mobile application.

In situations in which the systems discussed here collect personal information about users, or may make use of personal information, the users (e.g., user at the enterprise having both work and non-work accounts integrated together) may be provided with an opportunity to control whether programs or features collect user information (e.g., information about a user's social network, social actions or activities, profession, a user's preferences, or a user's current location), or to control whether and/or how to receive content from the content host that may be more relevant to the user.

In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content host.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A computer-implemented method, comprising:
   receiving, at data processing hardware, a first string of elements associated with a current online access credential for an online access attempt;
   during a credential training period, receiving, at the data processing hardware, a second string of elements associated with a new online access credential for the online access attempt;
   determining, by the data processing hardware, whether the first string of elements and the second string of elements match;
   in response to determining that the first string of elements and the second string of elements fail to match:
   performing, by the data processing hardware, a matching operation to determine a degree of matching between the first string of elements and the second string of elements; and
   based on the degree of matching between the first string of elements and the second string of elements:
   providing, by the data processing hardware, training feedback; and
   prompting, by the data processing hardware, another string of elements; and
   in response to determining that the first string of elements and the second string of elements do match:
   determining, by the data processing hardware, whether a duration of the credential training period has satisfied a threshold duration;
   in response to determining that the duration of the credential training period satisfies the threshold duration, changing, by the data processing hardware, the association of the current online access credential from the first string of elements to the second string of elements for subsequent online access attempts; and
   in response to determining that the duration of the credential training period fails to satisfy the threshold duration:
   providing, by the data processing hardware, an indication of a successful online access attempt; and
   maintaining, by the data processing hardware, the association between the first string of elements and the current online access credential until receipt of another string of elements.

2. The computer-implemented method of claim 1, wherein the credential training period is indicative of a credential reset period for online access.

3. The computer-implemented method of claim 1, wherein the duration of the credential training period is adjusted based on at least one of the degree of matching, a number of unsuccessful attempts associated with the new online access credential, an online user account setting, and an elapsed time of the credential training period.

4. The computer-implemented method of claim 1, wherein the training feedback is modified based on at least one of a number of unsuccessful attempts associated with the new online access credential, an online user account setting, and an elapsed time of the credential training period.

5. The computer-implemented method of claim 1, wherein the first string of elements comprises first individually hashed elements of the current online access credential and the second string of elements comprises second individually hashed elements of the new online access credential, and the matching operation comprises comparing respective first individually hashed elements and second individually hashed elements.

6. A non-transitory computer-readable medium configured to perform executable instructions stored in a storage, the executable instructions comprising:
   receiving a first string of elements associated with a current online access credential for an online access attempt;
   during a credential training period, receiving a second string of elements associated with a new online access credential for the online access attempt;
   determining whether the first string of elements and the second string of elements match;
   in response to determining that the first string of elements and the second string of elements fail to match:
      performing a matching operation to determine a degree of matching between the first string of elements and the second string of elements; and
      based on the degree of matching between the first string of elements and the second string of elements:
         providing training feedback; and
         prompting another string of elements; and
   in response to determining that the first string of elements and the second string of elements do match:
      determining whether a duration of the credential training period has satisfied a threshold duration;
      in response to determining that the duration of the credential training period satisfies the threshold duration, changing the association of the current online access credential from the first string of elements to the second string of elements for subsequent online access attempts; and
      in response to determining that the duration of the credential training period fails to satisfy the threshold duration:
         providing an indication of a successful online access attempt; and
         maintaining the association between the first string of elements and the current online access credential until receipt of another string of elements.

7. The non-transitory computer-readable medium of claim 6, wherein the credential training period is indicative of a credential reset period for online access.

8. The non-transitory computer-readable medium of claim 6, wherein duration of the credential training period is adjusted based on at least one of the degree of matching, a number of unsuccessful attempts associated with the new online access credential, an online user account setting, and an elapsed time of the credential training period.

9. The non-transitory computer-readable medium of claim 6, wherein the training feedback is modified based on at least one of a number of unsuccessful attempts associated with the new online access credential, an online user account setting, and an elapsed time of the credential training period.

10. The non-transitory computer-readable medium of claim 6, wherein the first string of elements comprises first individually hashed elements of the current online access credential and the second string of elements comprises second individually hashed elements of the new online access credential, and the matching operation comprises comparing respective first individually hashed elements and second individually hashed elements.

11. A device comprising:
   one or more hardware processors;
   a storage configured to receive a first string of elements associated with a current online access credential for an online access attempt, and during a credential training period, receive a second string of elements associated with a new online access credential for the online access attempt;
   a comparator, executed by the one or more hardware processors, configured to perform a matching operation to determine a degree of matching between the first string of elements and the second string of elements;
   a memory state engine configured to determine whether a duration of the credential training period has satisfied a threshold duration; and
   a learning controller, executed by the one or more hardware processors, configured to:
      in response to the comparator determining that the first string of elements and the second string of elements fail to match, provide training feedback based on the degree of matching between the first string of elements and the second string of elements and prompt another string of elements;
      in response to the comparator determining that the first string of elements and the second string of elements match and the memory state engine determining that the duration of the credential training period satisfies the threshold duration, change the association of the current online access credential from the first string of elements to the second string of elements for subsequent online access attempts; and
      in response to the comparator determining that the first string of elements and the second string of elements match and the memory state engine determining that the duration of the credential training period fails to satisfy the threshold duration, maintain an association between the first string of elements and a current online access credential until the storage receives another string of elements.

12. The device of claim 11, wherein the credential training period is indicative of a credential reset period for online access.

13. The device of claim 11, wherein the duration of the credential training period is adjusted based on at least one of the degree of matching, a number of unsuccessful attempts associated with the new online access credential, an online user account setting, and an elapsed time of the credential training period.

14. The device of claim 11, wherein the training feedback is modified based on at least one of a number of unsuccessful attempts associated with the new online access credential, an online user account setting, and an elapsed time of the credential training period.

15. The device of claim 11, wherein the learning controller is further configured to, in response to the comparator determining that the first string of elements and the second string of elements match and the memory state engine determining that the duration of the credential training period fails to satisfy the threshold duration, provide an indication of a successful online access attempt.

16. The device of claim 11, wherein the first string of elements comprises first individually hashed elements of the current online access credential and the second string of elements comprises second individually hashed elements of a new subsequent online access credential, and the matching operation comprises comparing respective first individually hashed elements and second individually hashed elements.

* * * * *